(12) United States Patent
Won et al.

(10) Patent No.: US 9,405,463 B2
(45) Date of Patent: Aug. 2, 2016

(54) DEVICE AND METHOD FOR GESTURALLY CHANGING OBJECT ATTRIBUTES

(71) Applicants: Sungjoon Won, Gyeonggi-do (KR); Dongseok Ryu, Seoul (KR); Jiyoung Moon, Seoul (KR); Hyojin Bae, Seoul (KR)

(72) Inventors: Sungjoon Won, Gyeonggi-do (KR); Dongseok Ryu, Seoul (KR); Jiyoung Moon, Seoul (KR); Hyojin Bae, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 303 days.

(21) Appl. No.: 13/668,534

(22) Filed: Nov. 5, 2012

(65) Prior Publication Data
US 2013/0135228 A1   May 30, 2013

(30) Foreign Application Priority Data

Nov. 25, 2011 (KR) .......................... 10-2011-0123958
Sep. 11, 2012 (KR) .......................... 10-2012-0100565

(51) Int. Cl.
G06F 3/0488 (2013.01)

(52) U.S. Cl.
CPC .................................. *G06F 3/04883* (2013.01)

(58) Field of Classification Search
USPC ..................... 345/173–178; 178/18.01–20.04
See application file for complete search history.

(56) References Cited

U.S. PATENT DOCUMENTS

| | | | |
|---|---|---|---|
| 2007/0152984 A1* | 7/2007 | Ording et al. | 345/173 |
| 2009/0207142 A1* | 8/2009 | Keranen | 345/173 |
| 2010/0138763 A1* | 6/2010 | Kim | G06F 1/1626 715/765 |
| 2010/0171712 A1* | 7/2010 | Cieplinski | G06F 3/04883 345/173 |
| 2011/0022958 A1* | 1/2011 | Kang | G06F 9/4443 715/716 |
| 2012/0030569 A1* | 2/2012 | Migos | G06F 3/04845 715/702 |
| 2012/0066648 A1* | 3/2012 | Rolleston et al. | 345/173 |
| 2012/0075241 A1* | 3/2012 | Bao | H01L 29/84 345/174 |
| 2012/0256847 A1* | 10/2012 | Mak et al. | 345/173 |
| 2012/0256849 A1* | 10/2012 | Crumly | G06F 3/04883 345/173 |

FOREIGN PATENT DOCUMENTS

KR   10-2011-0076292 A   7/2011

* cited by examiner

*Primary Examiner* — Ryan A Lubit
(74) *Attorney, Agent, or Firm* — Cha & Reiter, LLC.

(57) ABSTRACT

A method for displaying an object in a portable terminal having a touch screen is provided. An object having a changeable attribute is first displayed. A first touch is detected at a first location, and the object is selected responsive to the first touch. A second touch is detected at a second location. An attribute of the displayed object is changed according to a drag of the second touch, and the object having the changed attribute is displayed.

15 Claims, 23 Drawing Sheets

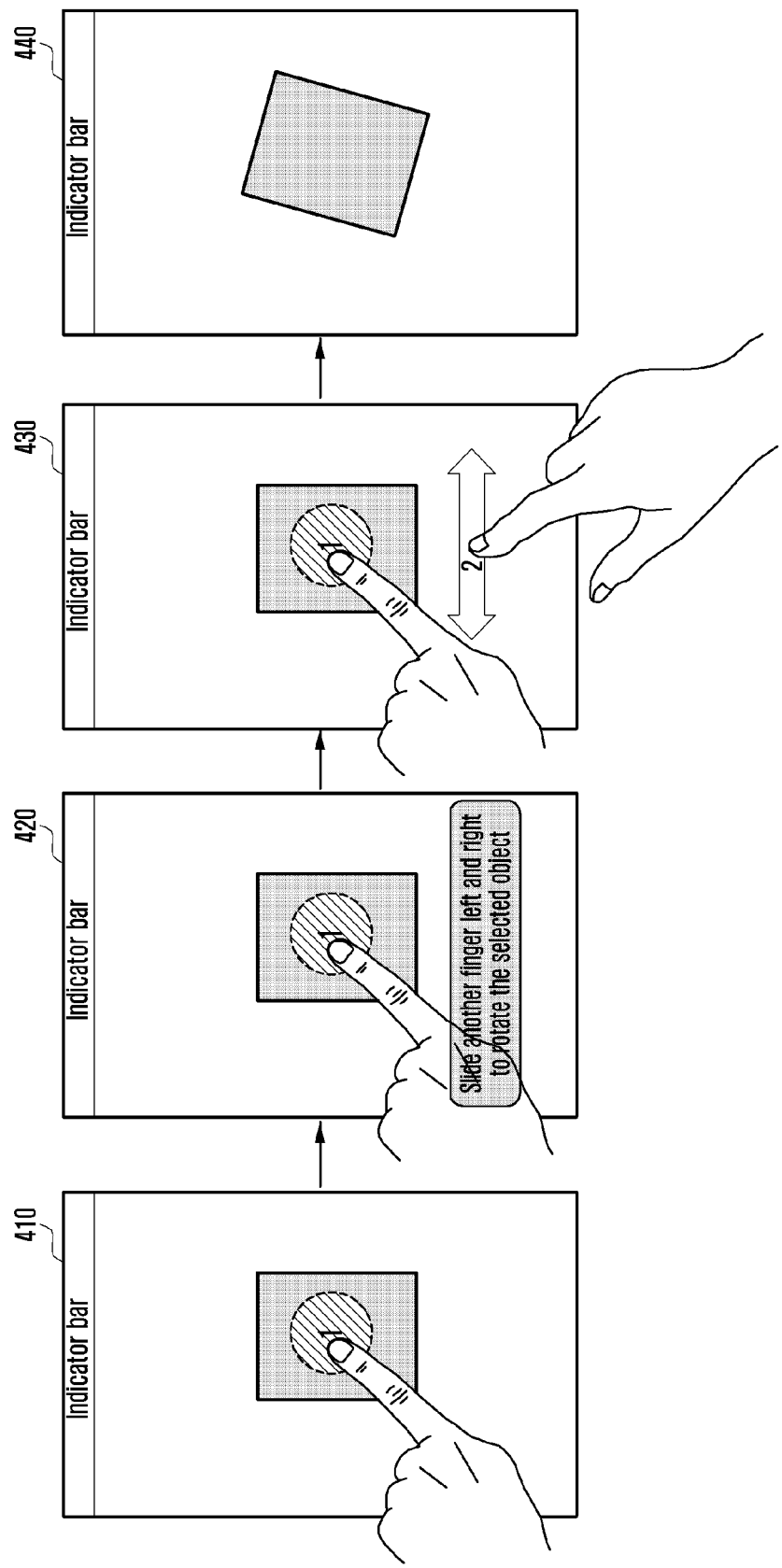

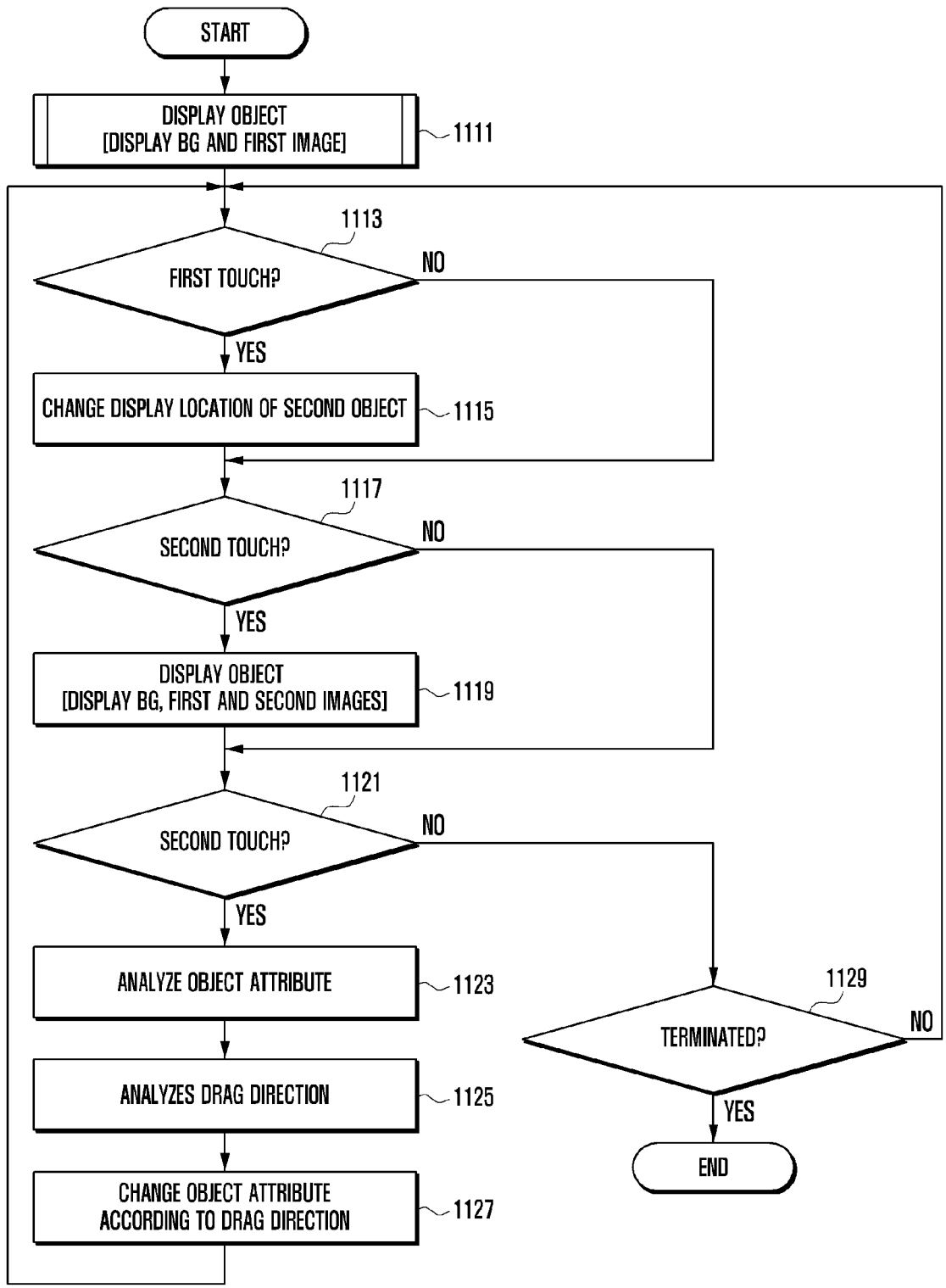

DEVICE AND METHOD FOR GESTURALLY CHANGING OBJECT ATTRIBUTES

CLAIM OF PRIORITY

This application claims priority under 35 U.S.C. 119(a) to applications filed in the Korean Intellectual Property Office on Nov. 25, 2011 and Sep. 11, 2012, and assigned Serial Nos. 10-2011-0123958 and 10-2012-0100565, respectively, the contents of which are incorporated herein by reference.

BACKGROUND

1. Technical Field

The present disclosure relates to graphical user interfaces and more particularly, to a device and a method for displaying, manipulating and modifying objects in a touch screen portable terminal.

2. Description of the Related Art

Touch screen portable terminals such as smart phones and tablet PCs have proliferated in recent years, providing users with a user friendly graphical user interface (GUI) allowing for rapid access to information. In recent designs, the size of the touch screen display has gradually increased, and accordingly display functions of the portable terminal have diversified. Some portable terminals further include a key pad embodied as a touch pad, separate from the touch screen, and may provide various input operations through the touch pad.

An image displayed on a screen may be moved by a touch and drag type of touch gesture, and an arrangement of images displayed in such a manner may be changed.

There is an ongoing need to improve GUIs in touch screen portable terminals to allow users to more efficiently interface with a variety of applications that may be run in these terminals.

SUMMARY

The present invention has been made in view of the above problems, and provides a device capable of modifying an attribute of an object and displaying the modified object in a portable terminal and a method thereof.

To do this, the present invention selects an object for changing an attribute by a first touch, changes the attribute of the selected object selected by means of a second touch, and displays the changed object.

In accordance with an aspect of the present invention, a method for displaying an object in a portable terminal having a touch screen is provided. An object having a changeable attribute is first displayed. A first touch is detected at a first location, and the object is selected responsive to the first touch. A second touch is detected at a second location. An attribute of the displayed object is changed according to a drag of the second touch, and the object having the changed attribute is displayed.

The first touch may be a touch on the object, and the second touch may be detected while the first touch is maintained. The first and second touches may be made by different fingers of the user. The changed attribute of the object may be one or more of an orientation angle, size, shape, and function setting.

In accordance with another aspect, portable terminal electronics includes a display unit displaying an object having a changeable attribute, where the display unit includes a touch screen providing touch signals responsive to touch events thereon. A controller is configured to detect first and second touches at first and second locations on the touch screen, respectively, according to touch signals provided thereby, and to change an attribute of the displayed object according to a drag of the second touch, and cause the displayed object having the changed attribute to be displayed on the display unit.

In another aspect, a background object and a first object having different layers are displayed. A second object is displayed in a first touched location when a first touch is detected. A paste layer is determined for the second object, with respect to the layers of the background and first objects, according to a drag direction of a second touch when the second touch occurs. The second object is then displayed at the paste layer.

BRIEF DESCRIPTION OF THE DRAWINGS

The aspects, features and advantages of the present invention will be more apparent from the following detailed description in conjunction with the accompanying drawings, in which:

FIGS. 4A to 4C are diagrams illustrating examples of modifying the object by the procedure shown in FIG. 3;

FIG. 11 is a flowchart illustrating a method of determining a location of an object to be pasted by a first touch and determining a display layer of an object to be pasted by a second touch in a portable terminal according to an embodiment of the present invention;

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is to be understood that the singular forms "a", "an" and "the" include plural referents unless the context clearly dictates otherwise. Thus, for example, reference to "a component surface" includes reference to one or more of such surfaces.

A portable terminal according to an embodiment of the present invention detects selection of an object by multi-touch and drag, modifies an attribute of the selected object, and displays the modified object in a portable terminal having a touch screen. Here, the object may be an image such as an icon, a user interface (UI) image, or photograph. To do this, an embodiment of the present invention detects a first touch input (e.g. touch, touch & hold, touch & drag) on at least a part of an object for modification on a displayed screen by a human appendage or a stylus to select an object whose attribute will be modified. Further, a second touch input at another part of the screen is detected while the first touch is maintained (held). The second touch is dragged in a preset direction ("touch and drag" operation). Then, a controller of the portable terminal detects modification in the attribute of the selected object, modifies the attribute of the object according to a drag direction and/or distance, and controls display of the modified object. Here, an attribute to be modified is previously set in the objects. There may be an orientation angle, a size, a shape of an object, function execution, location change, and paste of another object as a type of an attribute capable of being modified according to a second touch. One or more attributes of the object may be modified (for example, simultaneously modifying the size and an angle of the object).

Figure 1:
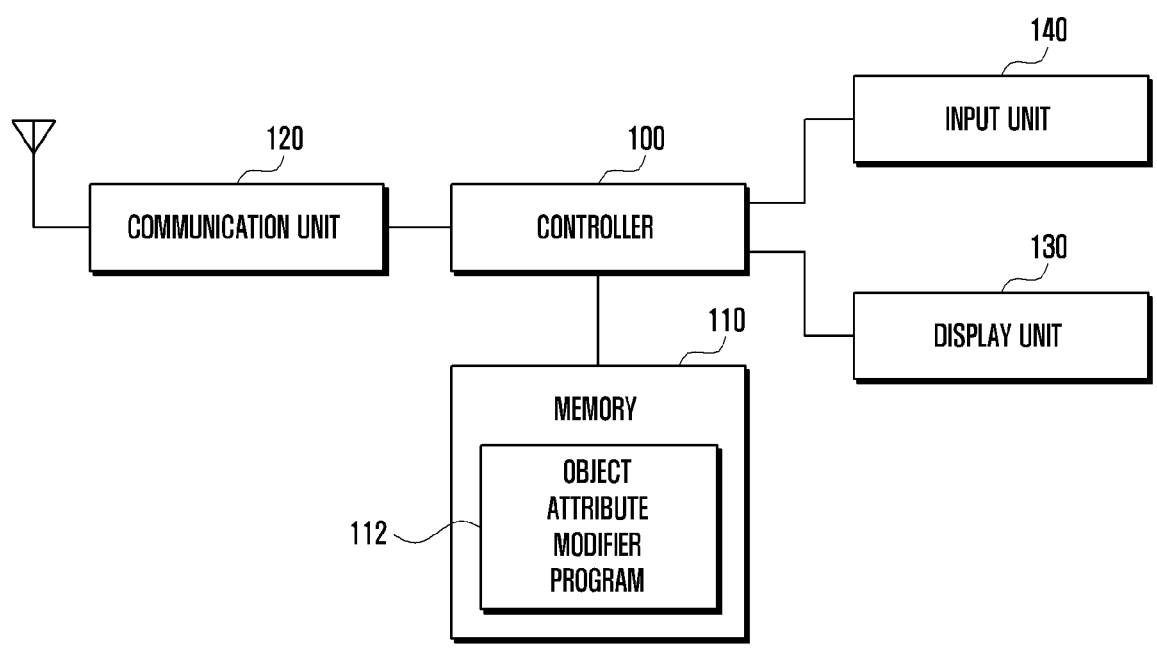
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention. The portable terminal includes a communication unit 120 performing a function of connecting the portable terminal to a corresponding communication network in a wireless scheme. Here, the communication network may be a base station communication network or an Internet communication network. The communication unit 120 may include a transmitter composed of a frequency up converter up-converting a transmission signal into an RF band and a power amplifier, and a receiver composed of an amplifier low-noise amplifying an RF received signal and a frequency down converter down-converting an RF signal to baseband. Further, the communication unit 120 may include a modulator modulating and transferring the transmission signal from the transmitter to an antenna, and a demodulator demodulating a signal output from the receiver. Here, the modulator and the demodulator may be a 3G modulator and demodulator such as WCDMA, CDMA or a 4G modulator and demodulator such as an LTE scheme. Further, the modulator and the demodulator may be a modulator and a demodulator such as Wi-Fi, Wibro, or Wimax. Any suitable modulation scheme can be used for those embodiments of the invention that include communication with external devices.

The controller 100 includes at least one processor to control an overall operation of the portable terminal in a conventional manner, by executing various programs stored in a memory 110. Memory 110 includes an operation program of the portable terminal, and an object attribute modifier program 112 according to an embodiment of the present invention. Memory 110 also stores installation data, data created during an execution of the program 112, and preset object modification attribute information with respect to respective objects in association with program 112.

When controller 100 executes the object attribute modifier program 112, in one aspect of the program, if a first touch on a displayed first object is detected, the controller 100 selects the first object as an object whose attribute can be modified. When a second touch is detected in another part of a screen (namely, another location of the screen excluding any part of the first object) the controller 100 causes an attribute of the first object to be modified, and the modified object is displayed. It is noted here, that as an alternative to controller 100 executing the program 112 to perform these operations, a separate, dedicated module could be employed for this purpose, which would operate in conjunction with controller 100. Such module could be hardware or software based.

The display unit 130 performs a function of displaying display data under control of the controller 100. The display unit 130 may include an LCD or an OLED. An input unit 140 performs a function of inputting commands and data for controlling an operation of the portable terminal. The input unit 140 may include a touch pad. Here, the input unit 140 and the display unit 130 may be an integral touch screen panel, where the touch screen portion is considered the input unit 140, and provides touch signals to controller 100 indicative of touch events.

As used herein, the term "object" means an image displayed on a screen, e.g., with a discernible boundary, and may be any of various images such as a menu icon, UI image, photograph, thumbnail, widget, or moving image. As used herein, "screen" or "display" in proper context (e.g., "an object on a screen" or "an object on a display") refers to a current visible area of an activated display unit. In this context, a totality of currently brightened pixels constitutes a screen. In other contexts, "screen" refers to a physical portion of a display unit, such as a touch screen of a display unit. As described above, changeable attributes of objects are pre-set and stored in the memory 110. Here, the changeable attribute may be size, an orientation, a shape of an object, function execution, location change, and/or paste of another image which is stored in the memory 110.

In a method of selecting a displayed object in accordance with embodiments herein, a touched state of the selected object maintained for at least a predetermined minimum time is detected. To this end, controller 100 detects touching and holding of the corresponding object through the input unit 140, which is preferably the touch screen integrated with display unit 130. When a touch on an object is detected by controller 100, the object is determined to be selected. In the foregoing state, the user performs a second touch operation in an area excluding the selected object with another appendage (e.g., another finger or hand) or stylus while the touch contact on the selected object is maintained. Then, the controller 100 detects that a new input occurs by the second touch in the touched state of the selected object through the input unit 140. Next, the controller 100 checks a modifiable attribute of the currently selected object, and modifies an attribute of the object according to e.g., a drag direction (moved direction) and a moving distance (moved distance) and displays the object of the modified attribute on the display unit 130. Screen examples of these operations will be explained below in connection with FIGS. 2 through 13.

Here, the first touch may be touch, touch & hold, or touch & drag interaction. Herein, "touch" means a touch contact that is held for at least a first minimum amount of time, i.e., long enough for a second touch outside the object to be detected. "Touch and hold" means a touch contact that is held for at least a second minimum amount of time longer than the first minimum. "Touch and drag" or just "drag" means a touch contact that is maintained while the user sweeps the appendage or stylus across the screen. A touch gesture refers to any touch operation such as a touch, touch and hold, or drag.

The second touch may be touch, touch and hold, or touch & drag. When the second touch is detected, the first touch becomes an input determining a location for selecting an object whose attribute is changed, where the attribute change may involve pasting an object according to a displayed object. (When pasting the object, the first touch may occur as touch & drag, as will become apparent later.)

The following describes an embodiment which involves initially selecting an object by the first touch, and changing an attribute of the selected object via the second touch. Thereafter, an embodiment is described involving selecting a location of an object to be pasted by the first touch and of changing an attribute of a paste object by the second touch.

In the following description of exemplary methods, it is assumed that the various operations are carried out under the control of the controller 100 executing the object attribute modifier program 112 stored in memory 110 (hereafter, "the controller" and "the memory", for brevity) in the portable terminal of FIG. 1. Reference numerals in flowcharts such as those of FIGS. 2 and 3 denote process steps in the exemplary processes and will be referred to parenthetically.

Figure 2:
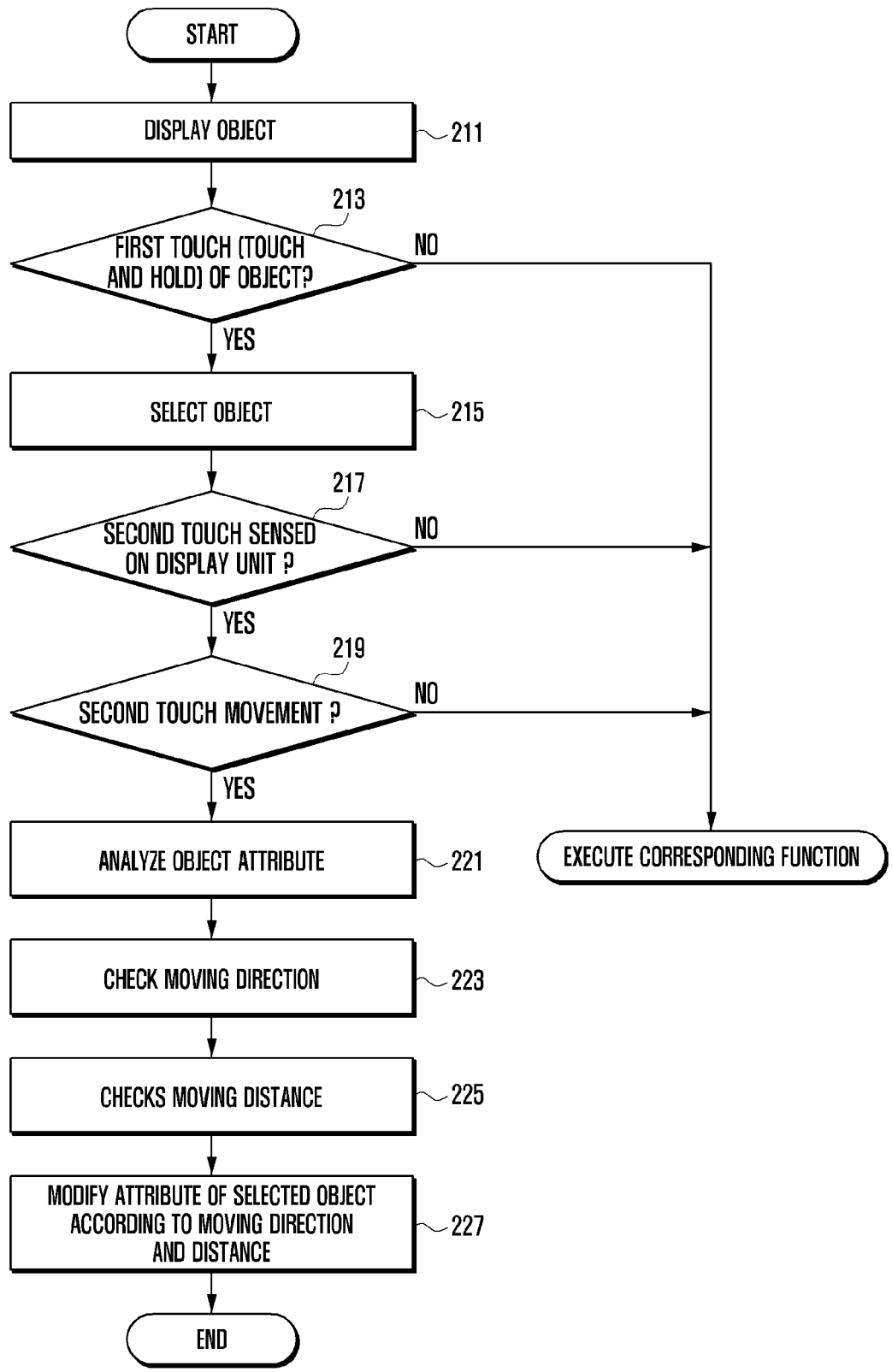
FIG. 2 is a flowchart illustrating a method for modifying an object attribute in a portable terminal according to an exemplary embodiment of the present invention.

FIG. 2 is a flowchart illustrating a method for selecting an object by a first touch and changing an object attribute by a second touch in a portable terminal according to an exemplary embodiment of the present invention. In the method, at least one object is initially displayed on a screen of display unit 130 (211). For example, as defined above, the object displayed at step 211 may be a menu icon, a photograph, a widget, and thumbnail image of a moving image and a still image. Next, as described above, if the user firstly touches a displayed object, the touch is detected via the touch screen and the controller to detect a first touch state of the object (213). In this state, the object determined to be selected (215).

In the foregoing state (a maintained state of the first touch), when the second touch is detected outside the area of the object, the controller detects the second touch and detects whether the second touch is moved (217). For example, when a user touches and holds a displayed object using the left hand to execute a first touch, and touches and drags on a certain area of the screen using the right hand to generate the second touch, the controller detects a first touch and a second touch through the touch screen. Accordingly, when the second touch is dragged, the controller detects the drag of the second touch (219), and analyzes a modifiable attribute(s) of the currently selected object. In this case, the memory stores a changed attribute of an object, where the changed attribute may include resize (enlarging or shrinking), orientation change (rotation), shape (expression of another image in a case of a widget), location change of the object, and/or execution of a specific function. After analyzing a modifiable attribute(s), the controller checks a drag direction of the second touch (223), and checks a moving distance of the drag (225), and modifies an attribute of the selected object according to the drag direction and distance of the drag (227). Note that in some implementations, an attribute of an object may be changed in a predetermined manner upon detection of a particular drag direction of the second touch, regardless of the movement distance. In this case, step 225 may be omitted.

For example, when the modifiable attribute of the object is size control, the controller determines reduction (shrinking) or magnification of the object according to a drag direction of the second touch, and controls the size of the object according to the moving distance. Further, when the modifiable attribute is orientation (the object is rotatable to a different tilt angle), the controller determines that a direction whose angle is controlled is forward (clockwise direction) rotation or reverse (counter-clockwise direction) according to a drag direction of the second touch, and controls a rotating angle of the object. Operations of steps 221 to 227 will be specifically described by modified attributes of the object.

Here, to modify the attribute of the object, the drag direction and/or the moving distance of the second touch is previously set. For instance, the program can be designed to modify an attribute in accordance with a drag direction of the second touch as a vertical movement, a horizontal movement, and/or a diagonal movement. In examples described below, it is assumed that the drag direction is the horizontal movement. Further, a type of the attribution modification may be determined according to the drag direction. For example, when the drag is a horizontal movement from left right the attribute modification can be set for size control, e.g., reducing the size of the object. When the drag is in the opposite direction from right to left, the size control is set for magnifying the size of the object. In a case where an attribute is set for angle control, when the drag is horizontally moved from left to right, the object is rotated clockwise. When the drag is horizontally moved from right to left, the object is rotated counter-clockwise. Further, the size of a modified attribute may be determined according to the moving distance of the second touch. This involves measuring the moving distance, and modifying an attribute of the object with the size or angle proportional to the moving distance. (Alternatively, in any of the above examples, the resulting modifications can designed for the opposite drag direction—e.g., a left to right drag can be designed to generate a counter-clockwise rotation, with right to left generating clockwise rotation.)

Accordingly, the memory 110 may store attribute modification types (execution of size, angle, shape, function) of respective objects, a drag direction and/or a moving distance of the second touch according to an embodiment of the present invention.

Figure 3:
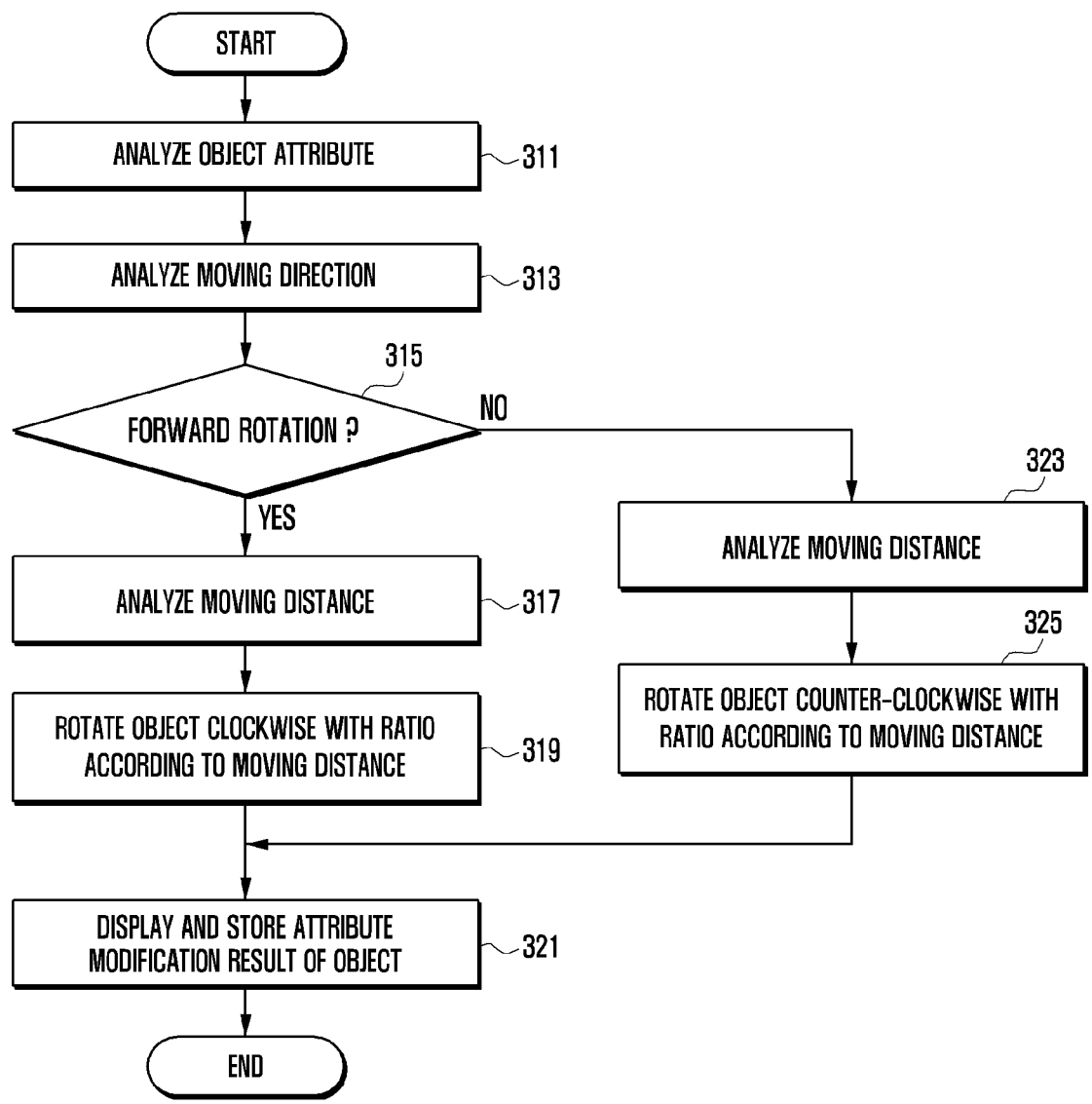
FIG. 3 is a flowchart illustrating an operation procedure of a portable terminal when a modified attribute of an object is angle change according to an exemplary embodiment of the present invention.
Figure 4B:
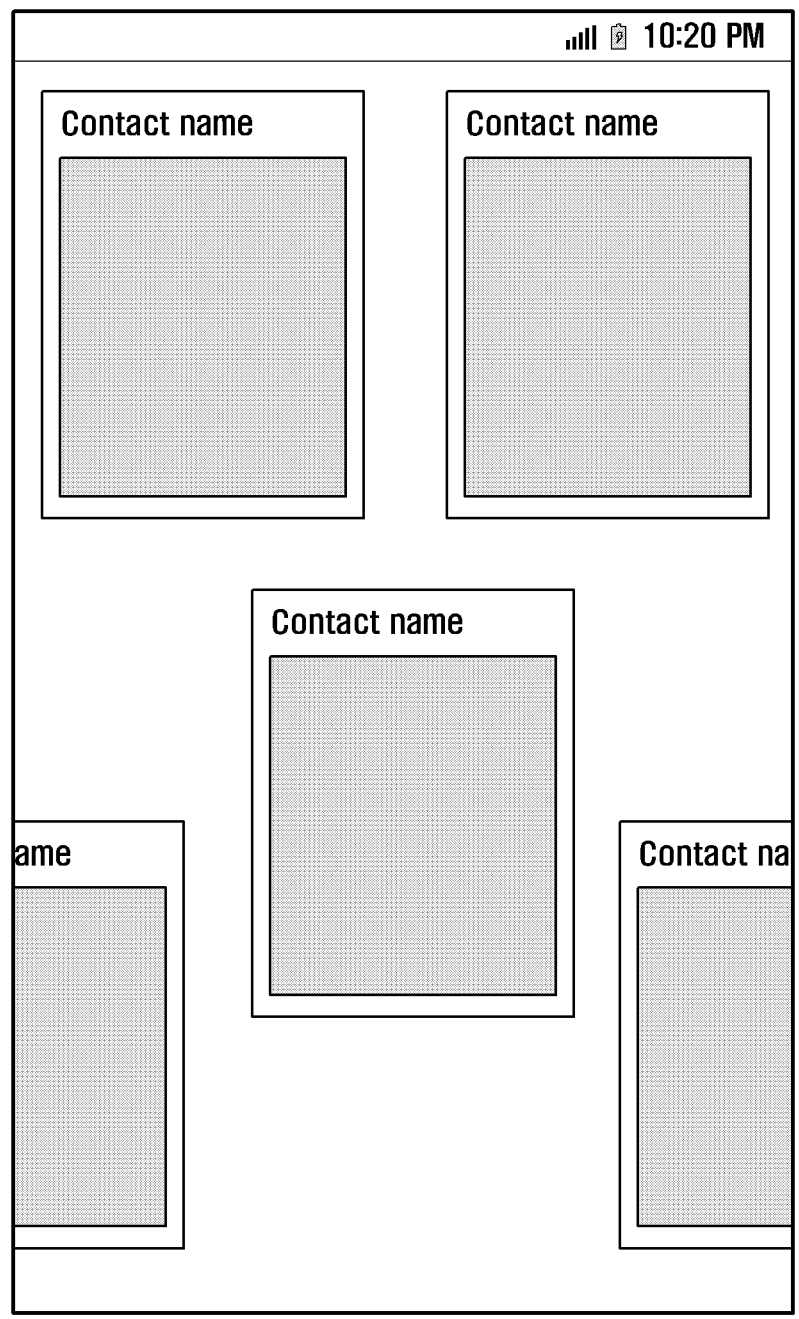
Figure 4C:
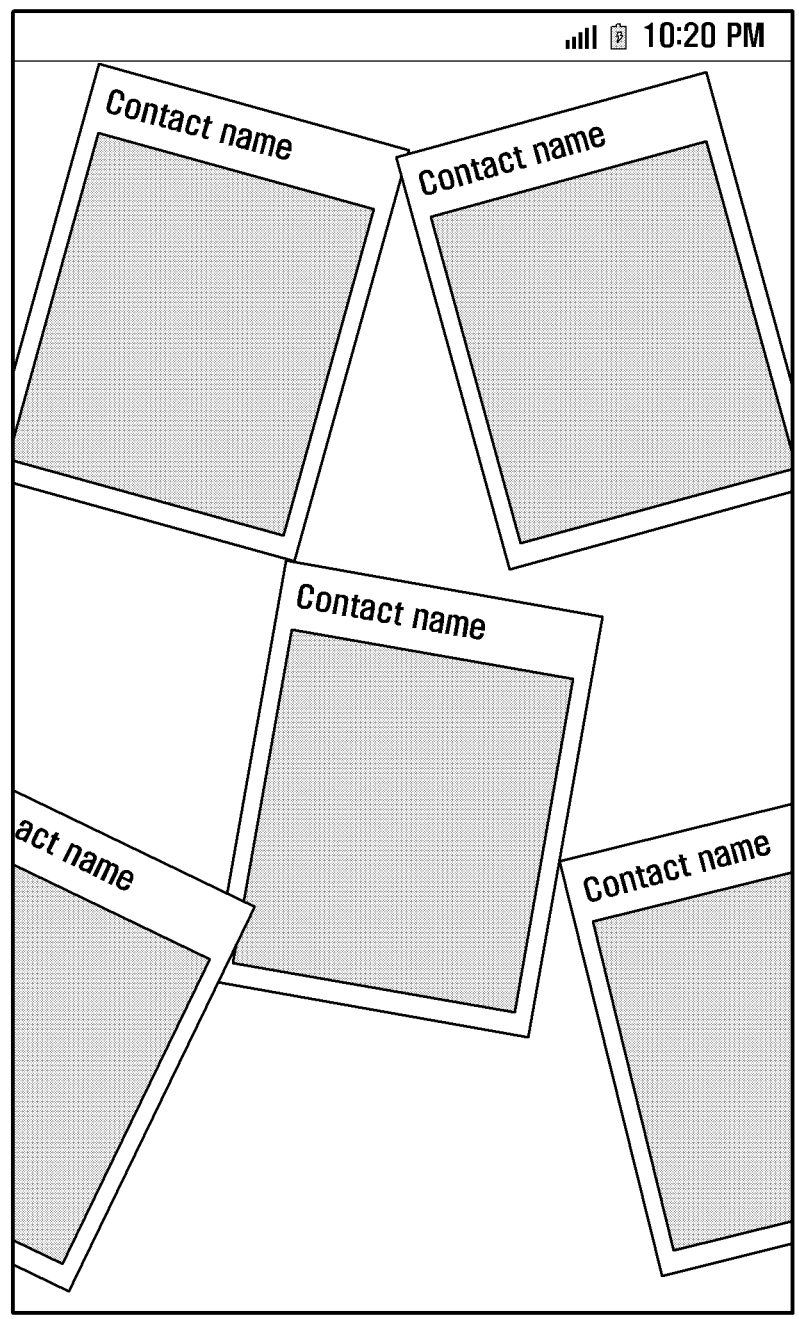

FIG. 3 is a flowchart illustrating an operation procedure of a portable terminal when a modified attribute of an object is angle change according to an exemplary embodiment of the present invention. FIGS. 4A to 4C are diagrams illustrating examples of modifying the object by the procedure shown in FIG. 3.

Referring to FIG. 3 to FIG. 4C, when an attribute of an object selected by a first touch is an attribute of angle change (311), the controller checks a drag direction of a second touch (313). In this case, when drag of the second touch is executed from left to right, the controller detects that the object attribute is a forward rotation, namely, rotation in a clockwise direction (315), and analyzes a moving distance (317). The object is then rotated clockwise with a ratio according to the moving distance (319). When the first touch and/or the second touch are terminated, the controller displays an attribute modification result of the object on the display unit 130 and stores it in the memory (321). On the other hand, at step 315, when the drag of the second touch is detected from right to left, the controller detects that the object is to be rotated counter-clockwise. Moving distance of the drag is analyzed at (323), and the object is rotated counter-clockwise with a ratio according to the moving distance (325). The controller displays and stores a modified result of the object at (321). That is, an attribute modification state of the object is displayed.

Screen examples of the method of FIG. 3 are illustrated in FIGS. 4A to 4C. In the screen 410 of FIG. 4A, when a user first touches (or touches and holds) an object, as indicated by the shaded circle, the controller detects a location touched through the touch screen to select the object, which is known to be located at the corresponding location. With the object thus selected and the touch maintained, a prompt such as "Slide another finger left and right to rotate the selected object" may be displayed in the vicinity, as illustrated in screen 420. When the second touch occurs in a state that the object is selected, the controller analyzes an attribute of the object stored in the memory. Next, as illustrated in screen 430, when a second touch drag is executed, the controller detects a drag direction and a moving distance, and accordingly rotates the corresponding object as illustrated in screen 440. Screen 440 illustrates an example of rotating an object clockwise.

The angle control for one or a plurality of objects may be performed on one screen. For example, when a plurality of objects are displayed as illustrated in FIG. 4B and respective objects are set as an object whose angle is changeable, the user may control respective angles of objects as illustrated in FIG. 4C while performing procedures in FIGS. 2 and 3.

Figure 5:
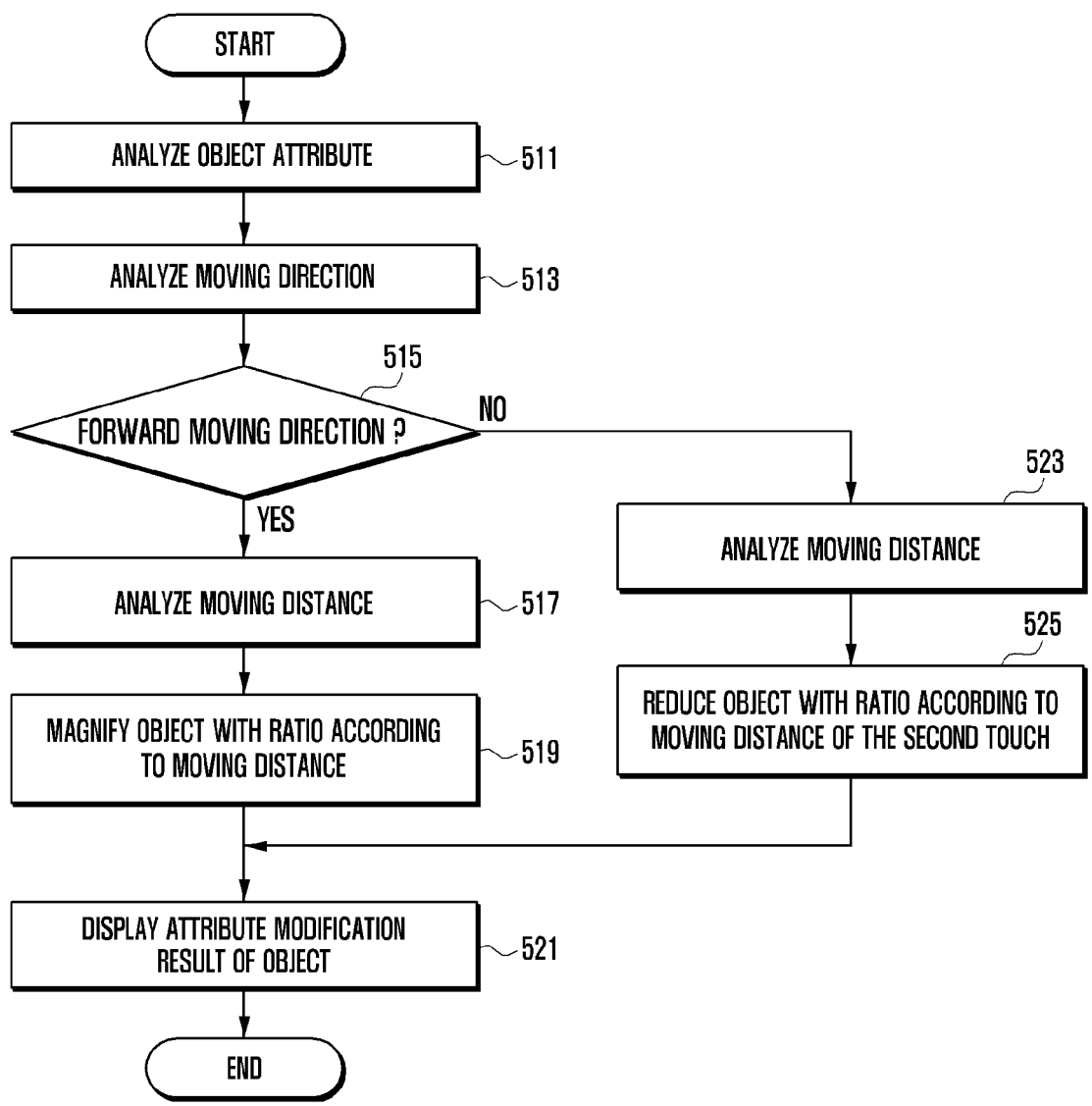
FIG. 5 is a flowchart illustrating an operation procedure of a portable terminal when a change attribute of an object is size change according to an exemplary embodiment of the present invention.
Figure 6:
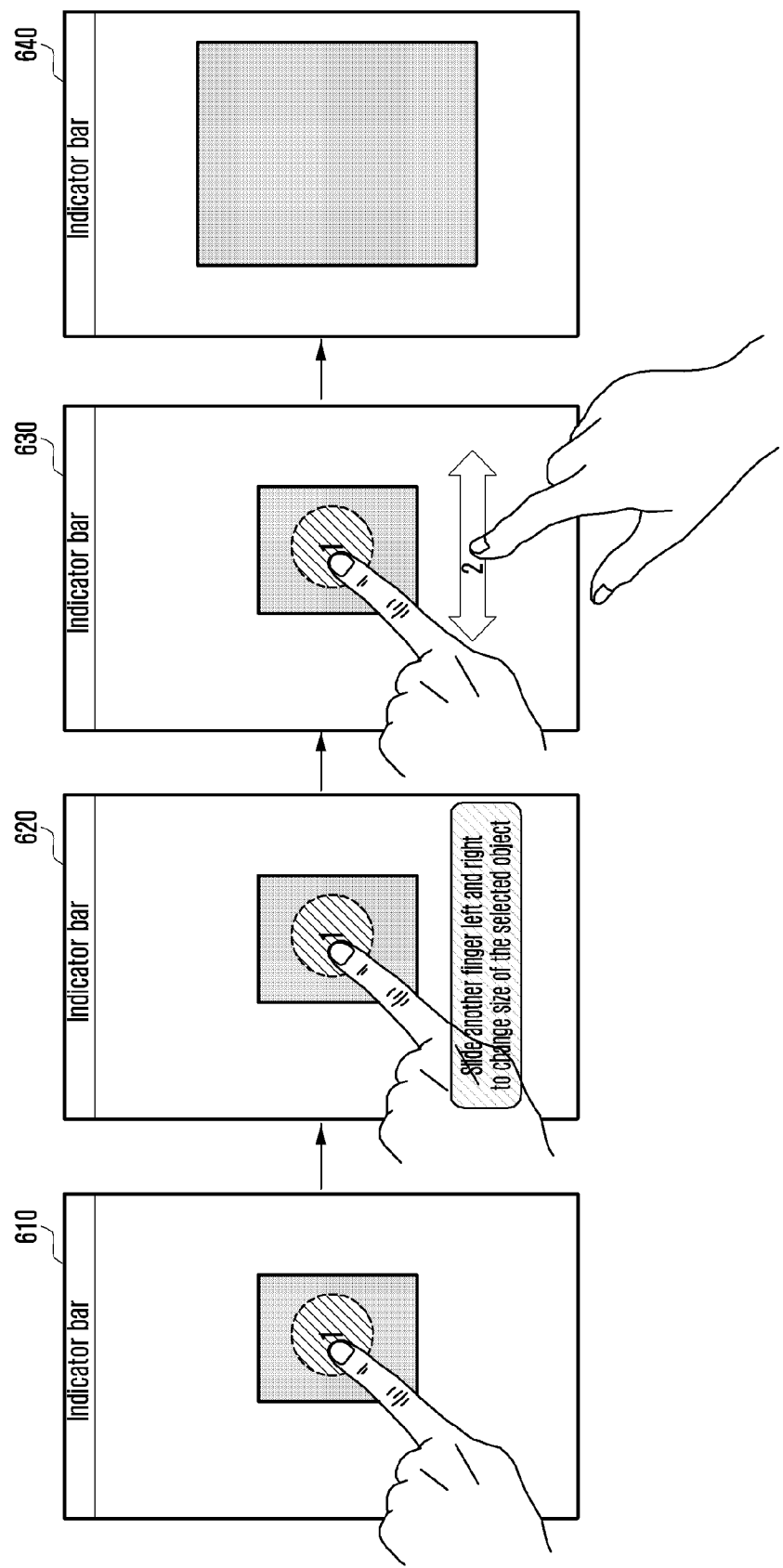
FIG. 6 is a diagram illustrating an example of changing the size of an object by the procedure shown in FIG. 5.

FIG. 5 is a flowchart illustrating an operation procedure of a portable terminal when a modified attribute of an object is size change according to an exemplary embodiment of the present invention. FIG. 6 is a diagram illustrating a screen example of changing the size of an object by the procedure shown in FIG. 5.

Referring to FIGS. 5 and 6, when an attribute of an object selected by a first touch is an object set due to size change (511), the controller checks a drag direction by a second touch (513). In this case, when drag of the second touch is executed from left to right direction, the controller detects that the object attribute is "forward direction" corresponding to object magnification (515). When drag of the second touch is executed from right to left, i.e. a reverse direction, the controller detects that the object attribute is object reduction (the NO result of query 515). When the object attribute is object magnification, the controller analyzes a moving distance (517). The controller 100 magnifies the object with a ratio according to the moving distance (519). In this case, the controller may display a result with size of the object changed according to a second touch drag of the user as a preview screen on the display unit 130. Next, when the first touch and/or the second touch are terminated, the controller 100 displays an attribute modification result of the object on the display unit 130 and stores it in the memory 110 (521). When it is determined that the size of the object is reduced at step 515, the controller reduces an object with a ratio according to a moving distance of the second touch and displays the reduced object (523, 525). If the first touch and/or the second touch are terminated, the controller displays and stores a modified result of the object (521).

FIG. 6 shows example screens to illustrate the method of FIG. 5. An object is first displayed in screen 610, and the user firstly touches (touches and holds) the displayed object. The controller detects a location touched through the touch screen to select the object which is known to be displayed at the corresponding location. In screen 620, the a prompt such as "Slide another finger left and right to change size of the selected object" is displayed in proximity to the selected object. If the second touch occurs in the state where the object is selected, the controller analyzes an attribute of the object stored in the memory. Next, when a second touch drag is executed as illustrated in screen 630, the controller detects a drag direction and a moving distance, and accordingly changes the size of the selected object, as illustrated in screen 640. Screen 640 illustrates an example of magnifying the size of the object.

As mentioned earlier, one example of an object is a widget. The widget is generated by a mini program (application) independently driving a use service, and is generated in an icon form. A user may use various functions through the widget without accessing a portal site providing contents. Since the widget may be used in various combinations according to individual selection, it can be based on a personal customized service. In this case, the widget may be configured by a plurality of images to express a corresponding function.

Figure 8A:
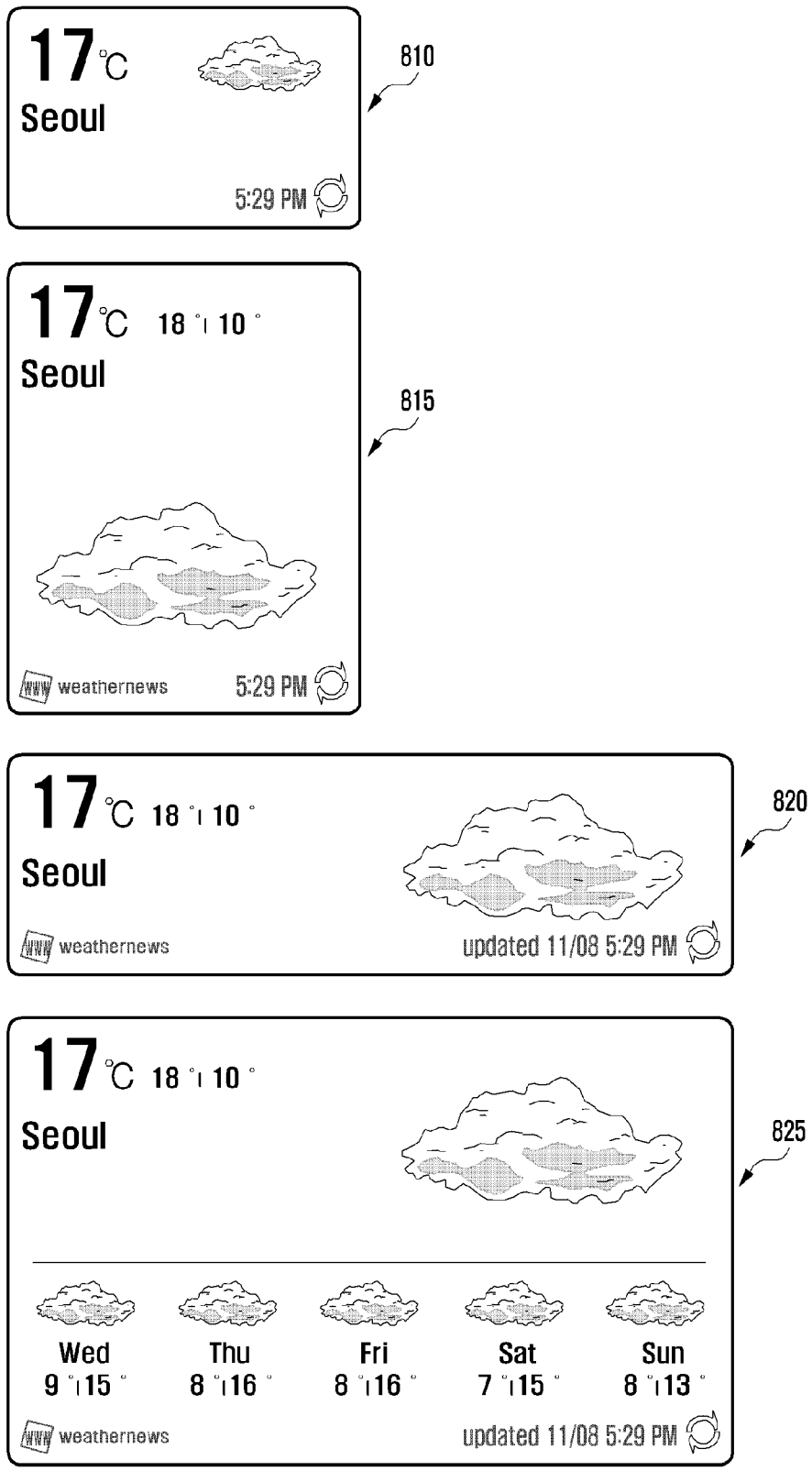
FIG. 8A is a diagram illustrating an example of a weather widget.

FIG. 8A is a diagram illustrating a weather widget as an example of the widget. In FIG. 8A, the weather widget may express a weather condition or forecast as one of images 810-825 according to user selection. An embodiment of the present invention provides a method capable of modifying the expression of a widget configured by a plurality of images, by means of a second touch after selecting the widget by a first touch during expression of the widget.

Figure 7:
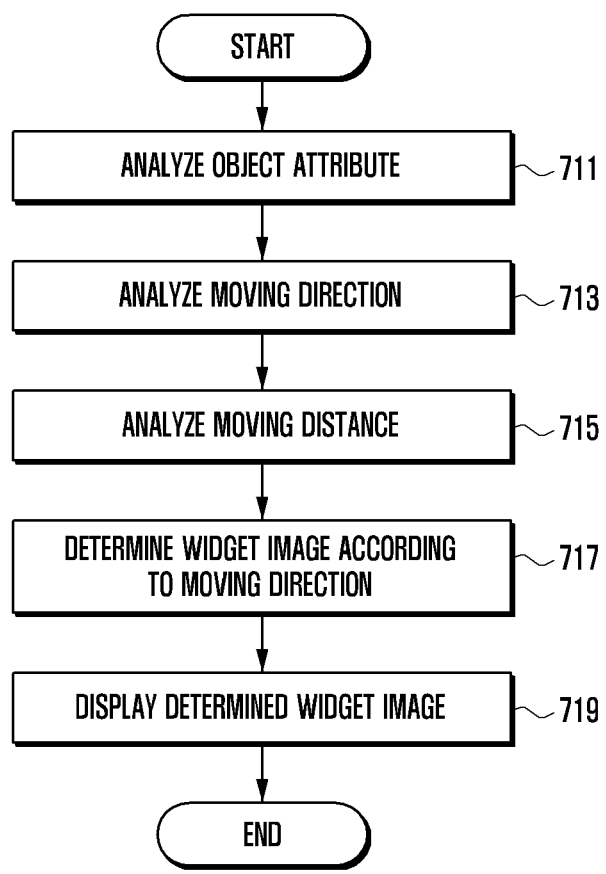
FIG. 7 is a flowchart illustrating a procedure of expressing a widget configured by a plurality of images according to an exemplary embodiment of the present invention.
Figure 8B:
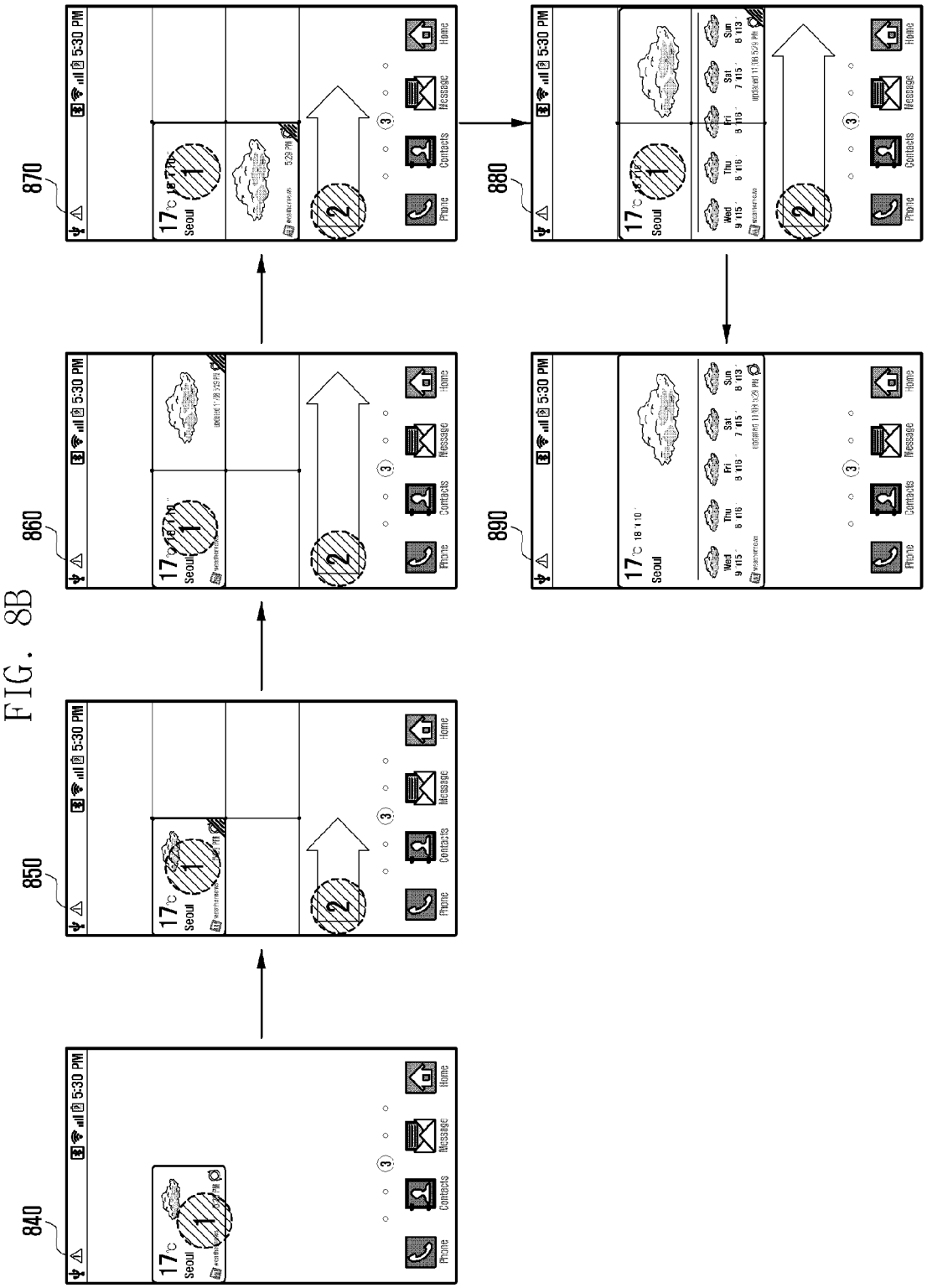
FIG. 8B is a diagram illustrating a procedure of expressing a widget according to a procedure shown in FIG. 7.

FIG. 7 is a flowchart illustrating a procedure of expressing a widget configured by a plurality of images according to an exemplary embodiment of the present invention. FIG. 8A is a diagram illustrating examples of a weather widget. FIG. 8B is a diagram illustrating a procedure of expressing a widget according to a procedure shown in FIG. 7.

Referring to FIGS. 7 to 8B, when it determined at step 711 that an object attribute selected by a first touch is a widget object, a controller 100 analyzes a direction moved according to a second touch (713), and analyzes a moving distance (715).

Here, the drag direction may be used as an element for determining whether the widget is selected in a forward order or in a reverse order of images constituting the widget. The moving distance may be used as an element for selecting a widget image corresponding to a moving distance location in a preset order. Next, the controller selects a widget image according to the drag direction and the moving distance and displays it as a preview screen (717). When the first touch and/or the second touch are terminated, the controller 100 displays the selected widget image on the display unit 130 and stores the selected widget image in the memory.

It is assumed for the purpose of explication that the widget is a weather widget, and the weather widget image is configured by images 810-825 as illustrated in FIG. 8A. It is further assumed that display of the widget image is set to a structure displayed in an order of the images 810, 815, 820, 825 according to drag distance. In this case, as illustrated in screen 840 of FIG. 8B, when a displayed weather widget image is firstly touched (touched and held), the controller detects selection of the weather widget image. In response, a number of empty rectangles or squares may be displayed as illustrated in screen 850, prompting the user to input a second touch for modifying the widget image. Subsequently, when the user performs a second touch and drag, the controller selects a weather image as illustrated in screens 860-880 to display it on the display unit 130 as a preview screen. If the first touch and/or the second touch are released, the controller detects the release and displays the selected weather widget image as illustrated in screen 890.

In this case, when drag of the second touch is executed from left to right, the controller detects the drag as an input touch gesture (input command) selecting a widget image in a forward order. In this case, the weather widget image may be displayed in an order of 810, 815, 820, and 825. When drag of the second touch is executed from right left direction, the controller detects it as input selecting a widget image in a reverse order. In this case, the widget image may be displayed in an order of 810, 825, 820, and 815. As illustrated above, in a case of an object such as a widget composed of a plurality of images, if drag of the second touch is achieved after the object is selected by a first touch, the controller may select and display a plurality of images constructing the object in a manner set according to drag direction and distance.

Current portable terminals may express many images in various forms. One approach is to display a thumb-nail image. The thumb-nail image may be used to display photographs and moving images (videos). When a thumb-nail moving image is displayed, in general, the controller displays a plurality of thumb-nail moving images but does not output an audio signal. An embodiment of the present invention is applicable to a method of simultaneously playing an audio signal of a certain thumb-nail moving image and controlling a volume.

Figure 9:
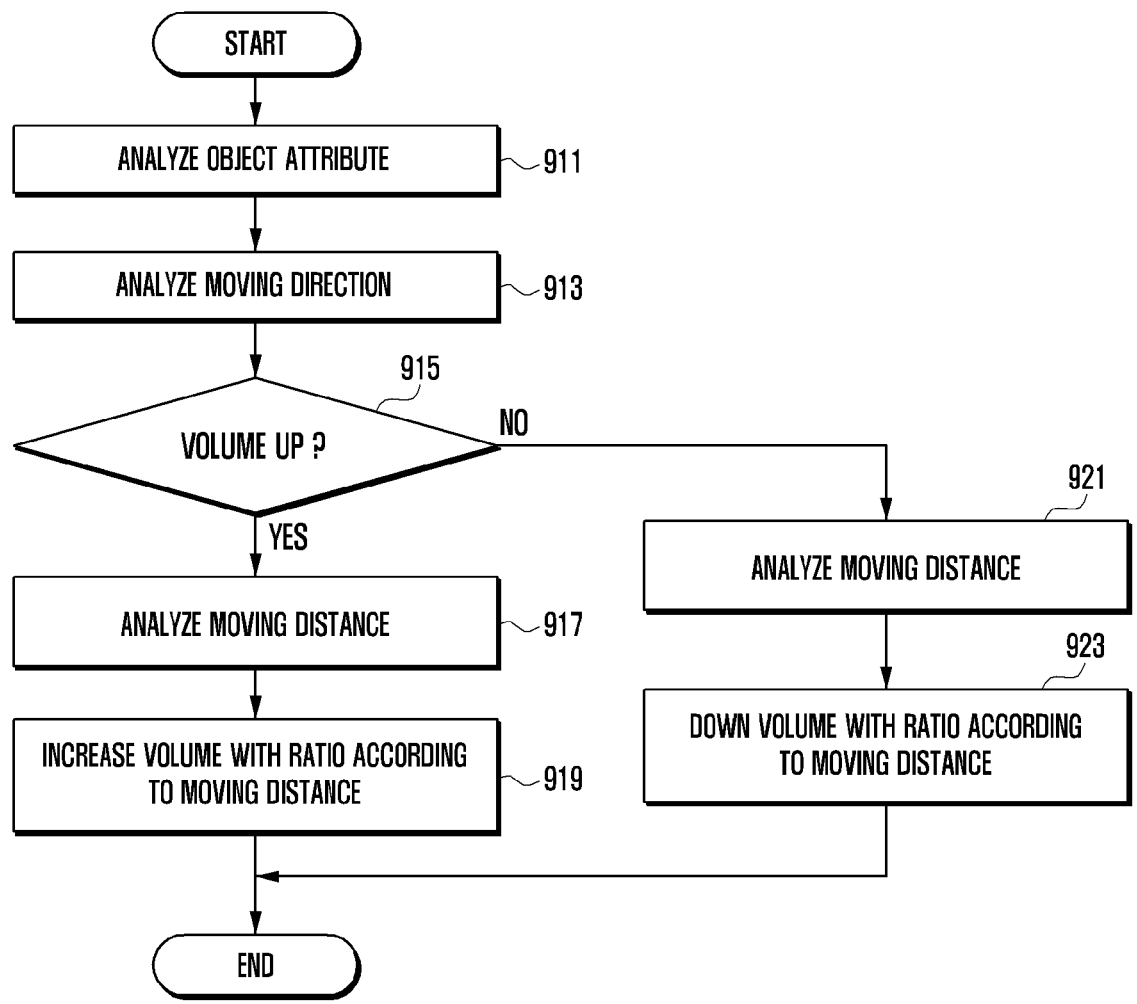
FIG. 9 is a flowchart illustrating an operation procedure of a portable terminal when an object attribute is a thumbnail moving image and a modified attribute is volume control according to an exemplary embodiment of the present invention.
Figure 10:
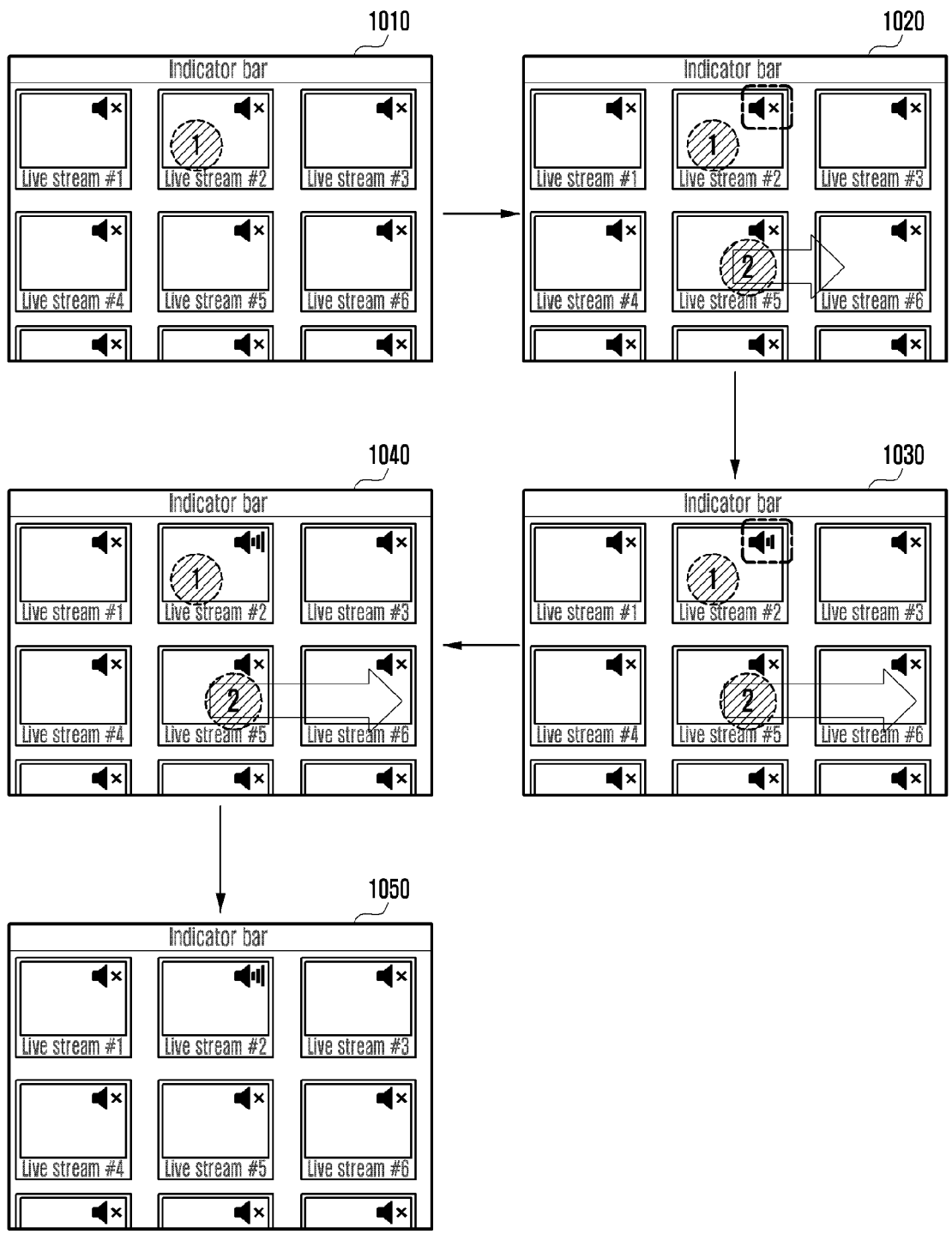
FIG. 10 is a diagram illustrating an example of changing a certain function of an object using a procedure shown in FIG. 9.

FIG. 9 is a flowchart illustrating an operation procedure of a portable terminal when an object attribute is a thumb-nail moving image and a modified attribute is volume control according to an exemplary embodiment of the present invention. FIG. 10 is a diagram illustrating an example of changing a certain function of an object using a procedure shown in FIG. 9.

Referring to FIGS. 9 and 10, if a user firstly touches a certain displayed thumb-nail moving image (e.g., first touch may be a speaker location if a speaker is displayed on the thumb-nail moving image), the controller may check a thumb-nail moving image of a location in which the first touch occurs on the touch screen. If the second touch occurs in this state, the controller recognizes that the second touch is volume control of the selected thumb-nail moving image. Accordingly, when the object attribute is selected by the first touch at step 911, the controller analyzes a direction moved by the second touch (913). In this case, when drag of the second touch is performed from left to right direction, the controller detects that the second touch is volume up for the selected thumb-nail moving image (915). When the drag of the second touch is from right left, the second touch is detected as volume down for the selected thumb-nail moving image. When the second touch is the volume up, the controller analyzes a dragged distance (917), and increases a volume of an audio signal in the selected thumb-nail moving image with a ratio according to the moving distance (919). Conversely, when the second touch is the volume down at step 915, the controller 100 analyzes a dragged distance (921), and downs a volume of an audio signal in the selected thumb-nail moving image with a ratio according to the moving distance (923).

As described above, in a state that a thumb-nail moving image is displayed as illustrated in screen 1010 of FIG. 10, when the user firstly touches (touches and holds) a certain thumb-nail moving image, the controller detects a location touched from the touch screen to select an object of a corresponding location. As illustrated in screen 1020, in response to the first touch, a volume icon on the selected thumb nail image may be highlighted, thereby prompting the user to apply a second touch to adjust the volume (which, when applied, is illustrated as the number "2" surrounded by a dashed circle in screen 1020). Further, as described previously, if the second touch occurs in a selected state of the object, the controller 100 analyzes the drag direction and distance of the second touch to control audio volume of a selected thumb-nail moving image as illustrated in reference numerals 1030-1040 (where a higher number of volume bars indicates to the user that a higher volume has been set). Next, when the user releases the first touch and/or the second touch, the controller can cause the audio of the selected thumb-nail moving image to be played, as illustrated in screen 1050, or the audio with volume thus set can be played after another predetermined input command is received.

As described in the examples above, when the attribute of an object is modifiable, an embodiment of the present invention detects selection of the object by the first touch and modifies the attribute of the selected object by means of the second touch. As described above, there may be execution of the size, an angle orientation), or a function as a type of attribute modification. In some implementations, when the foregoing object is selected, at least two attributes may be modified by predetermined directions of second touches. For example, the object can be a photographic image, and attribute modification of the photographic image may be set to control the size and an angle. In this case, the first and second drag directions may be set as angle and size control functions, respectively. For example, horizontal movement may be set by angle control of a photographic image and vertical movement may be set by size control of the photographic image.

In the foregoing set state, when an object is displayed on a screen of the display unit 130 and the user touches a displayed photographic image and then maintains a touched state, the controller detects the first touched state through the input unit and detects that a photographic image of a touched location is selected. When the second touch is detected on the display unit 130 in the foregoing state, the controller detects whether the second touch is dragged. In this case, when the drag direction of the second touch is a horizontal movement, the controller checks that a direction whose angle is controlled is forward (clockwise) rotation or reverse (counter-clockwise) rotation according to a drag direction (movement from the left to the right or from the right to the left), and controls a rotating angle of a photographic image according to the moving distance. When the drag direction of the second touch is a vertical movement, the controller magnifies or reduces the size of the photographic image (i.e., controls zoom) according to the drag direction (movement from upper side to lower side or from the lower side to the upper side).

In this case, the controller performs the first touch to select a photographic image, horizontally moves the second touch to control an angle of the photographic image, and vertically moves the second touch to control the size of the photographic image. In a converse order, the controller 100 performs the first touch to select the photographic image, vertically moves the second touch to control the size of the photographic image, and horizontally moves the second touch to control an angle of the photographic image. In addition, the controller performs the first touch to select the photographic image, horizontally or vertically drags of the second touch to control only an angle or size of the photographic image.

FIGS. 2 to 10 illustrate embodiments which select an object whose attribute is changed by the first touch and change an attribute of the selected object by the second touch. The embodiment of the present invention may paste another object while displaying objects of different layers. In this case, the portable terminal may determine a location of an object to be pasted by a first touch (touch & drag) and determine a layer of an object to be pasted by the second touch (touch & drag).

FIG. 11 is a flowchart illustrating a method of determining a location of an object to be pasted by a first touch and determining a "display layer" of an object to be pasted by a second touch in a portable terminal according to an embodiment of the present invention. Here, the object may be a photographing image, a moving image screen, a thumbnail, a document image, an icon for other attachments (such as audio file), or an UI image. (In the case of a moving image screen, i.e., a video clip, a single still image of the video clip may be displayed as representing the video clip.) The "display layer" indicates whether the object to be pasted is displayed such that it appears in front of, or behind, another displayed object when the pasted object and the other object overlap.

Referring to FIG. 11, the controller displays an object on a screen of a display unit 130 (1111). Here, at least two objects having different layers may be displayed on a display unit 130 and considered as a displayed object (for the purpose of considering attribute modification of an object), where either object can be a menu icon, an image, and/or a widget. In this case, the displayed object may be divided into a background (hereinafter referred to 'BG') object and an object (hereinafter referred to as 'first object') having a layer different from the BG object. That is, the BG object and the first object have different layers and the first object may be displayed on the BG object. The controller selects a second object to be pasted at step 1111 or before performing step 1111. That is, after selecting a second object to be firstly pasted by selection of the user, the controller may perform step 1111. The controller may select a second object to be pasted during performing step 1111. When the second object to be pasted is selected, the controller may control the second object to a suitable size in consideration of the size of the first object. (Note that the "second" object is different from the BG object, so it could also be considered a third object; however, "second object" will be used to refer to the pasted object.)

As described above, if a user inputs a first touch (touch & drag) in an optional region of the display unit 130 in a state where objects having different layers are displayed, the controller detects the first touch state through an input unit 140 and determines the first touched location to a paste location of the second object (1113). That is, if the first touch occurs in a state where the BG object and the first object having different layers are displayed, the controller determines the first touched location as a paste location of the second object. In this case, if movement of the first touch occurs, that is, when drag of the first touch is detected, a paste location of the object may be changed according to the dragged direction and distance.

If the second touch is detected in the foregoing state (a maintained state of the first touch), the controller detects the second touch and determines whether the second touch is moved (1117). For example, if the user executes the first touch and touches & drags on a specific region of the screen with another finger to generate the second touch, the controller may detect the first touch and the second touch through the touch screen. Accordingly, if the second touch is detected, the controller detects the second touch and displays the BG object, the first object, and a second object to be pasted (1119). In this case, a display location of the second object to be pasted is determined by the first touch. During the second touch, the second object may be displayed superimposed with, but in front of, the first object. If the user drags the second touch in the foregoing state, the controller 100 detects the dragged second touch (1121), analyzes an attribute (paste) of the second object (1123), analyzes a drag direction of the second touch (1125), and determines a layer displaying a second object to be pasted according to the drag direction to modify and display the attribute (1127). If the drag of the second touch is detected, the controller 100 modifies and displays a layer of a second object to be pasted according to a drag direction of the second touch while performing steps 1123 to 1127. In this case, the controller changes a layer of the second object to be pasted according to the drag direction of the second touch and displays the changed layer of the second object between the BG object and the first object or in front of the first object. In other words, changing the "layer" of the second object has the following significance: when the position of the second object is selected, via the first touch, such that the second and first objects overlap, then a higher selected layer will result in the second object being displayed as if in front of the first object A lower selected layer will result in the second object being displayed as if behind the first object.

The foregoing operation is terminated when the first touch and/or the second touch is released. That is, after the first touch and the second touch occur, the user may drag the first touch and the second touch. If the first touch is dragged, the controller detects the dragged first touch and changes a display location of a second object to be pasted (1115). If the second touch is dragged, the controller modifies and displays a display layer of the second object to be pasted according to a drag direction of the second touch while performing steps 1123 to 1127. If the first touch and the second touch are released, the controller detects the released first and second touches and terminates a paste operation of the second image (1129).

FIGS. 12A to 12D are diagrams illustrating examples of a procedure of changing a display location and a display layer of an object to be pasted in a portable terminal according to an embodiment of the present invention.

Figure 12A:
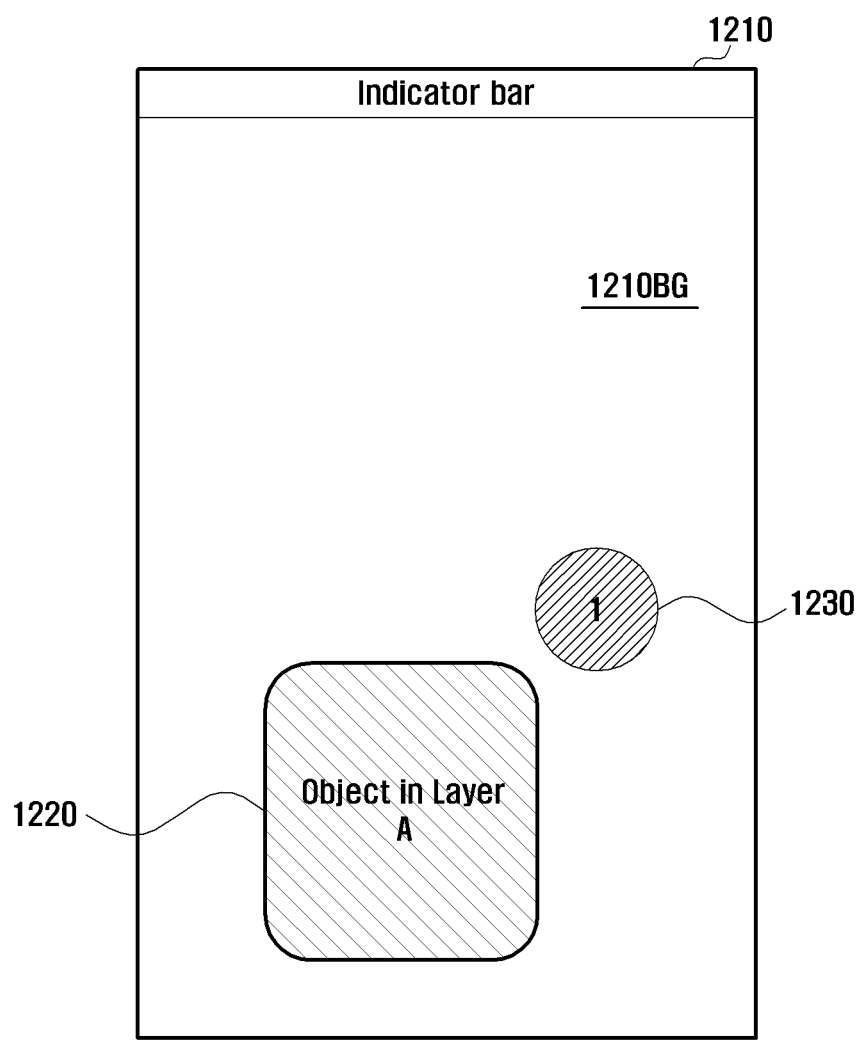
FIGS. 12A to 12D are diagrams illustrating examples of a procedure of changing a display location and a display layer of an object to be pasted in a portable terminal according to an embodiment of the present invention.

Referring to FIG. 12A, example screen 1210 displays a BG object 1210BG (illustrated as just a white area), and a first object 1220, the BG object and the first object have different layers, and the two objects are displayed on the display unit 130 as substantially the entirety of one screen 1210. FIG. 12A illustrates a state that a second object to be pasted is selected, as indicated by the touch input 1230. That is, when a first touch is detected on the background object 1210BG (also referred to interchangeably as "background image"), this is detected as a command for initiating the pasting of a second object on the background image. The foregoing states may correspond to operations of steps 1111 and 1113 of FIG. 11. In this case, the portable terminal has entered a paste mode for performing the procedure as illustrated in FIG. 11, via a predetermined command. During performing the paste mode, the controller select a BG object 1210BG and a first object 1220 selected by the user (1111) In this case, the first object 1220 is considered an upper layer ("object in layer A") of the BG object 1210BG, because it appears superimposed with, but in the front of, the background object 1210BG.

In the foregoing state, the BG object 1210BG and the first object 1220 are displayed (1111). In this state, if the first dragged touch 1230 is dragged, the controller detects the first touch (1113) and determines a display location of a second object to be pasted (1115).

Figure 12B:
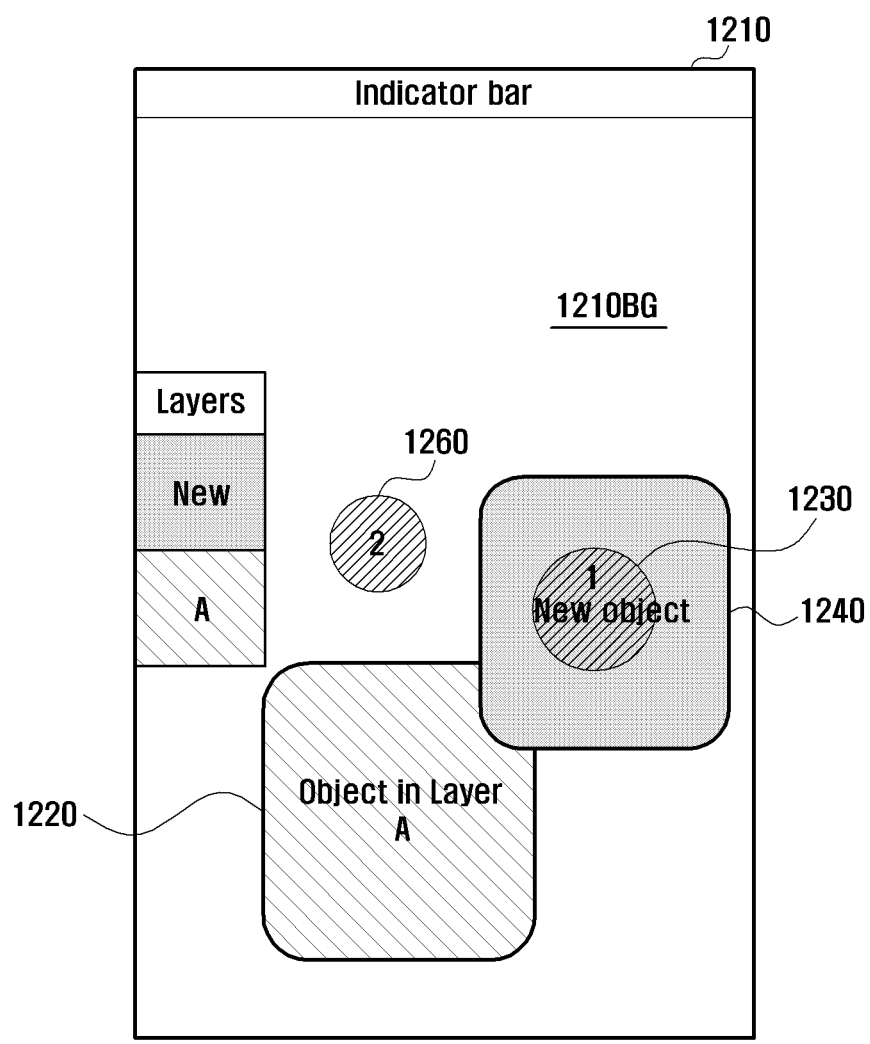
Figure 12C:
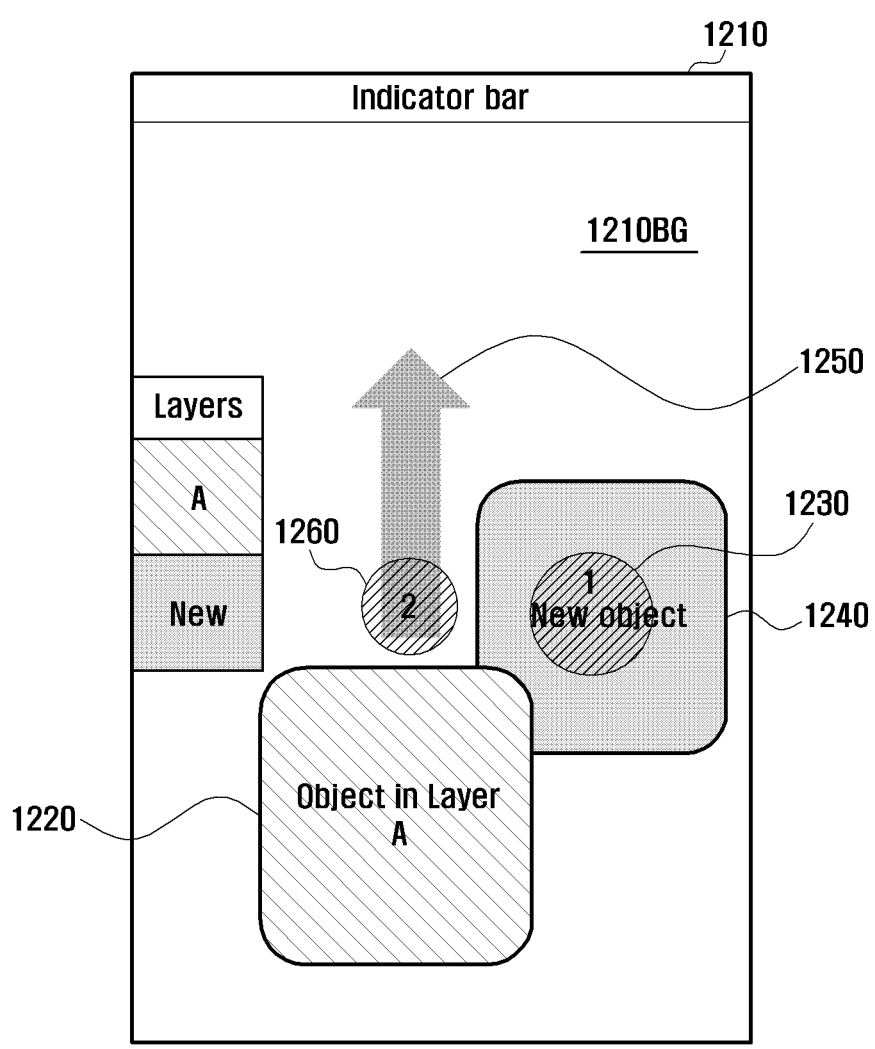
Figure 12D:
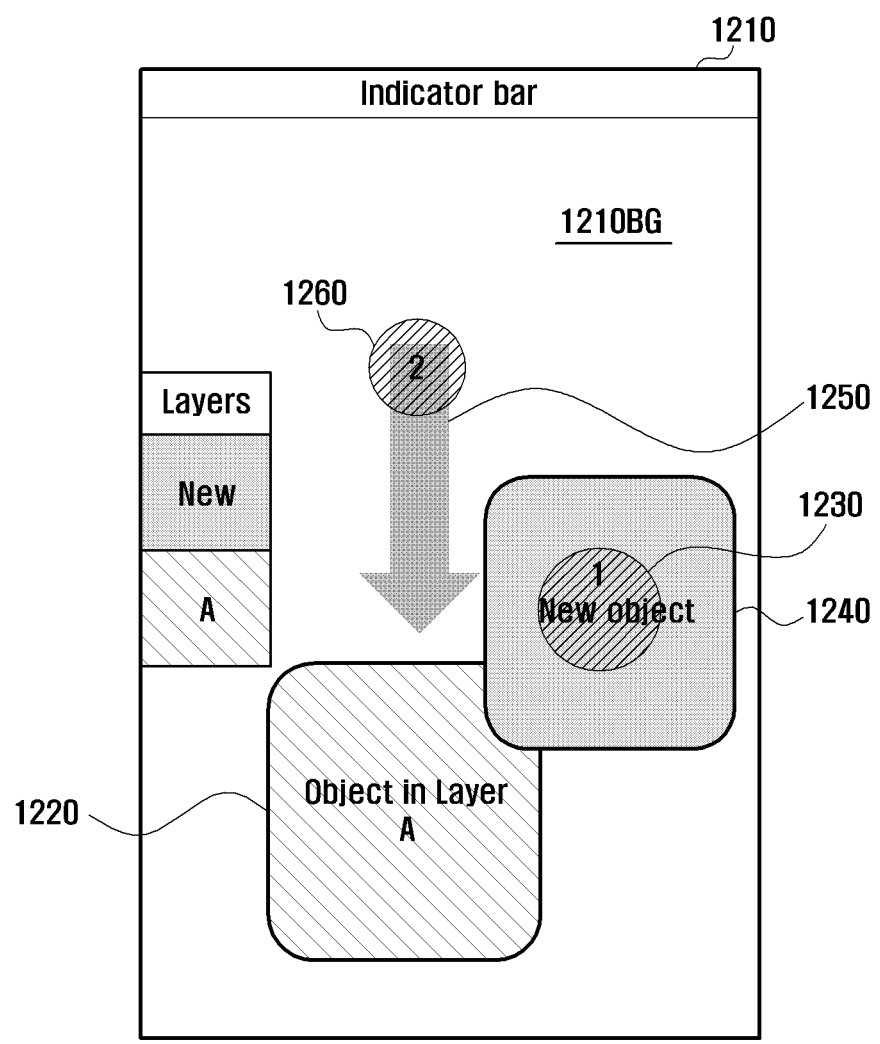

If the first touch is dragged in the foregoing state, the controller changes a display location of the second object to a location corresponding to a direction and a distance of the drag. When a second touch 1260 occurs (refer to FIG. 12B), if the second touch is dragged, the controller determines a default layer location of a second object 1240 to be pasted as an upper layer of the first object 1220 as shown in FIG. 12B. In the foregoing state, as shown in FIGS. 12C and 12D, a paste layer of the second object 1240 is determined according to a drag direction. In FIGS. 12C and 12D, a drag direction of the second touch is performed upward as illustrated in reference numeral 1250, it is determined that a paste layer of the second object 1240 is located between layers of the first object 1220 and the BG object 1210BG. FIGS. 12C and 12D illustrate an example of determining that a paste layer of the second object 1240 is an upper layer of the first object 1220 when a drag direction of the second touch 1250 is performed downward. As illustrated in FIGS. 12C and 12D, if a drag direction of the first touch 120 is changed in a state that the layer of the second object 1240 is determined in a drag direction of the second touch, the controller changes a display location of the second object 1240. Next, if the user releases the first touch and the second touch, the controller stores the BG object 1210, first object 1220, and second object 1240 according to a layer determined in a corresponding time point in a memory 110. In this case, changed layer information and location information of the objects may be simultaneously stored.

The embodiment of the present invention is described when a displayed object (comprising a first object and a background image) has two layers by way of example. In this case, the second object may be pasted between two objects (between the first object and the background image) or in an upper layer of the uppermost object (i.e., in front of the first object). However, when there are at least three objects displayed on one screen, the controller may select a location of an object layer to be pasted by a first touch and set a paste layer of an object to be pasted by the second touch. A level of a layer of an object to be pasted may be determined by a size of the second touch (e.g., dragged distance in a case of a drag touch interaction). For example, A-D objects are displayed on a screen and layers of the A-D objects are different from each other, the controller determines a location of an object to be pasted by a first touch, and determines a layer of a pasted object located between the A and B objects, between the B and C objects, between the C and D objects, or as an upper location of the D object.

FIGS. 13A to 13D are diagrams illustrating examples of another procedure of changing a display location and a display layer of an object to be pasted in a portable terminal according to an embodiment of the present invention. Here, it is assumed that the object to be pasted is an image.

Figure 13A:
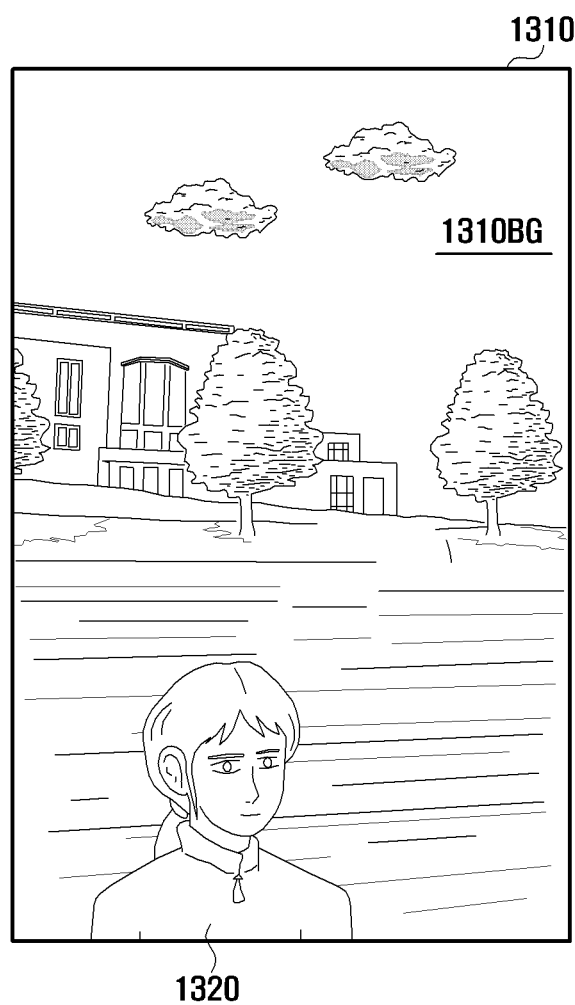
FIGS. 13A to 13E are diagrams illustrating examples of another procedure of changing a display location and a display layer of an object to be pasted in a portable terminal according to an embodiment of the present invention.
Figure 13B:
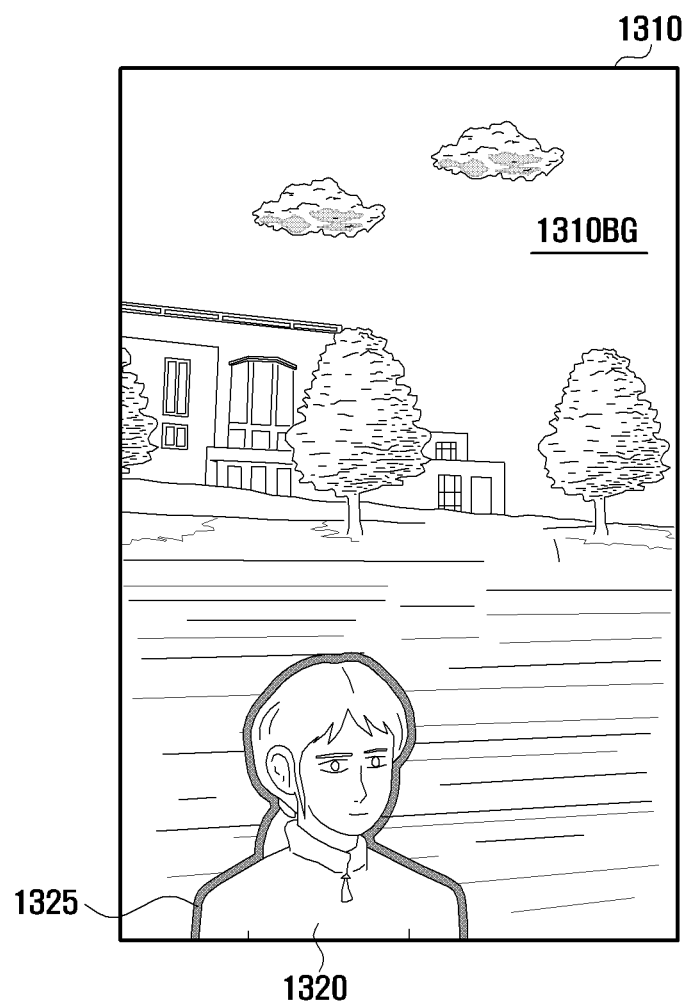
Figure 13C:
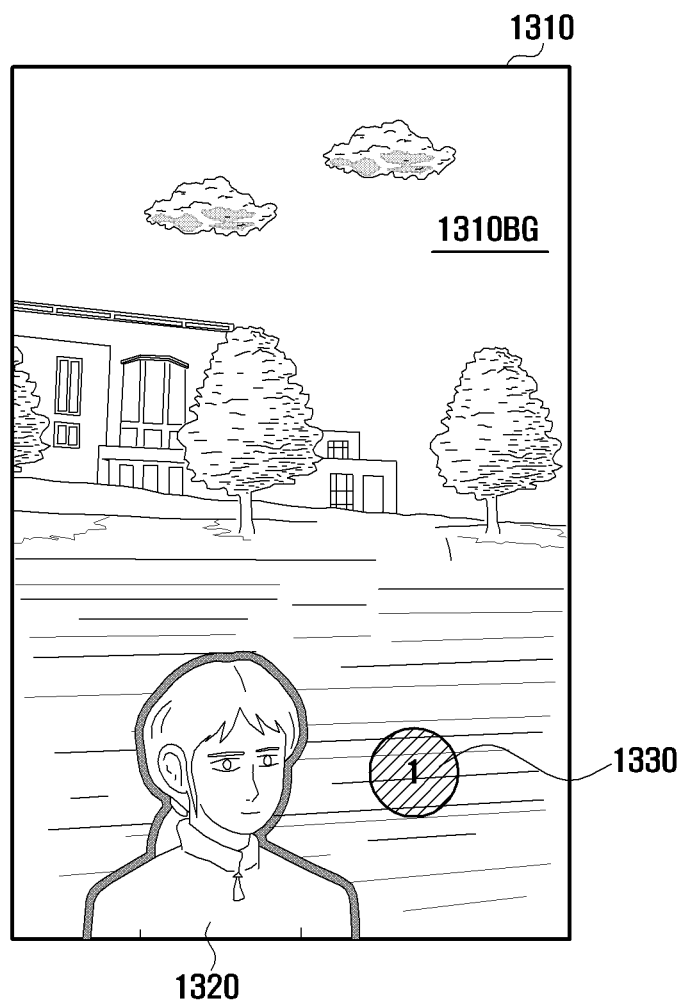

Referring to FIGS. 13A to 13D, in FIG. 13A, screen 1310 displays a BG image 1310BG and a first image 1320. At this time the BG image 1310 and the first image 1320 are considered to be a part of the same layer. That is, in the embodiment of FIG. 12, the BG image 1210 and the first image 1220 are considered objects of different layers, while the BG image 1310BG and the first image 1320 of FIG. 13A are considered images of the same layer. FIG. 13A is a state where a second image to be pasted is also selected. As described above, the portable terminal may include a paste mode for performing a procedure as illustrated in FIG. 11. In this case, during performing the paste mode, the controller may select an image including a BG image 1310BG and a first image 1320 of the same layer by a user as illustrated in FIG. 13B (1111). In this case, the user differentiates the second image 1320 from the BG image 1310BG as shown by the highlighting 1325 in FIG. 13B and identifies it as another layer. That is, the user, as shown in FIG. 13B, selects the first image 1320, shows the selected first image 1320 separated using the highlighting 1325 and selects it as a new layer (temporarily separates the selected first image area from the rest of the background image in the original layer). That is, the controller generates a first image 1320 having instant current layer to separate from an original layer of the BG image 1310BG. A method of generating a first image having another instant layer to optionally separate from the BG image 1310BG may be implemented by photo shop. In this case, the BG image 1310BG and the first image 1320 from which a layer is optionally separated may be displayed on the display unit 130 as one screen as illustrated in FIG. 13B. In this case, the first image 1320 may be displayed as an upper layer of the BG image 1310BG. In the paste mode, the second image 1340 may be selected and the selected second image 1340 may be controlled in the size according to the size of the first image 1320.

Figure 13D:
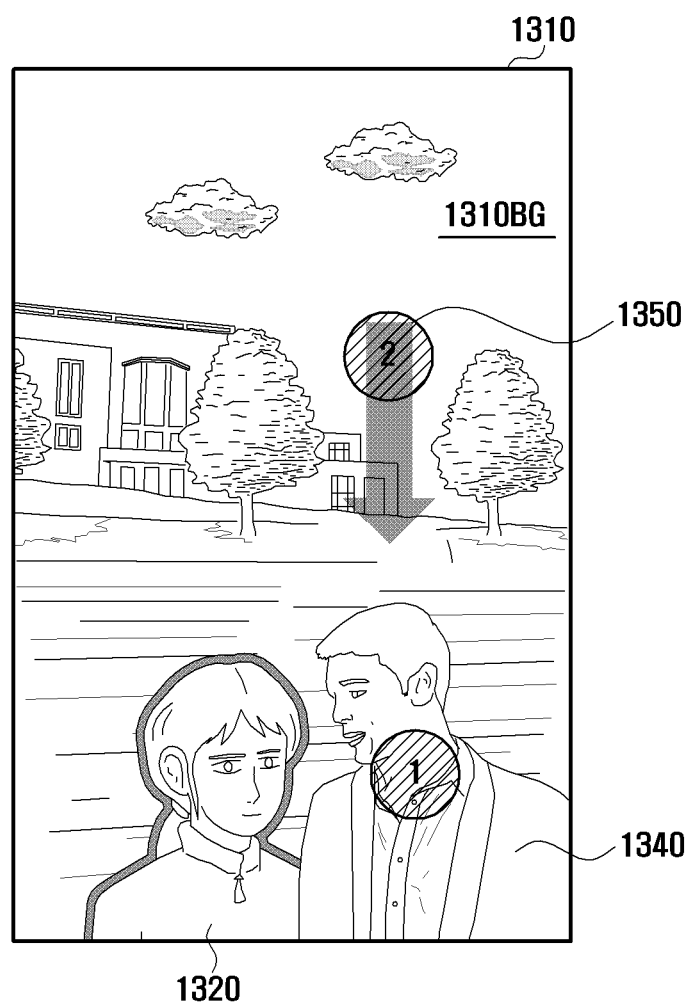
Figure 13E:
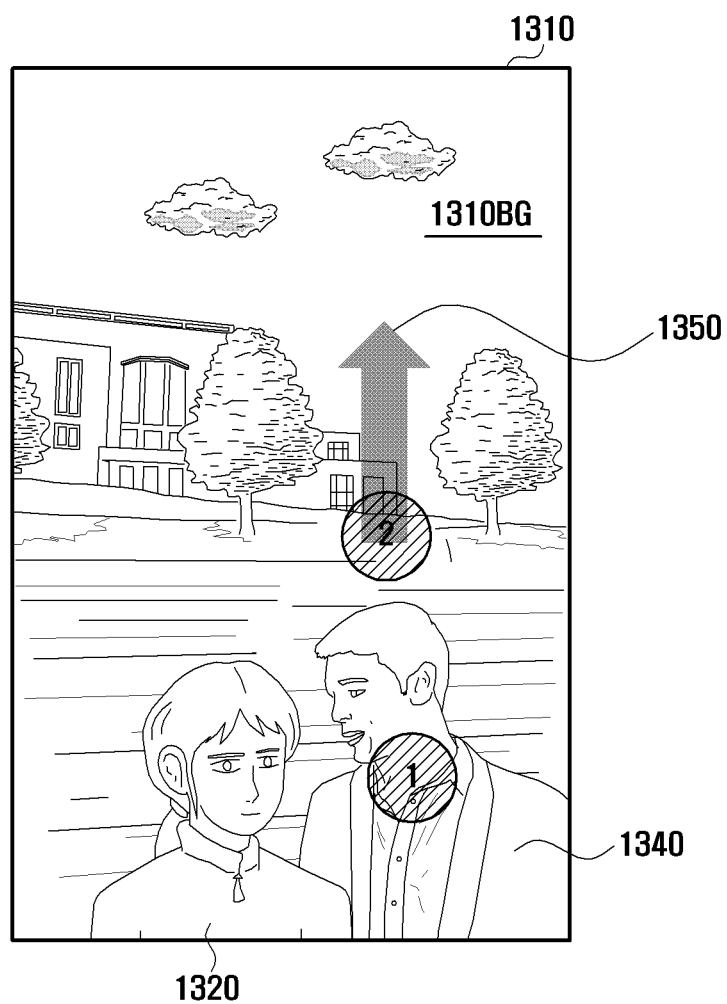

In the foregoing state, the controller displays the BG image 1310BG and the first image 1320 from which a layer is optionally separated (1111). In the state as illustrated above, as shown in FIG. 13C, if drag of the first touch 1330 occurs, the controller detects the first touch (1113), and determines a display location of the second image to be pasted (1115). If the drag of the first touch occurs in a state as illustrated above, the controller changes a display location 1330 of the second image 1340 to a location corresponding to a direction and a distance of the drag. If the second touch 1350 occurs, the controller displays the second image 1340 on the determined display location 1330. Initially, as shown in FIG. 13D, a default layer location of the second image to be pasted is determined as an upper layer of the first image 1320. In the foregoing state, as shown in FIGS. 13D and 13E, according to a drag direction of the second touch, a paste layer of the second image 1340 is determined. In this case, a drag direction of the second touch is performed upward as illustrated in reference numeral 1350 of FIG. 13E, it is determined that a paste layer of the second image 1340 is located between layers of the first image 1320 and the BG image 1310BG. As shown, FIG. 13D illustrates an example of determining a paste layer of the second image 1340 as an upper layer of the first image 1320 if a drag direction of the second touch 1350 is performed downward. As illustrated in FIGS. 13D and 13E, in a state that a layer of the second image 1340 is determined by a drag direction of the second touch, if a drag direction of the first touch 1350 is changed, the controller changes a display location of the second image 1340. After that, if the user releases the first touch and the second touch, the controller stores a BG image 1310, a first image 1320, and a second image 1340 according to a layer determined in a corresponding time point in the memory. In this case, changed layer information and location information of the images may be simultaneously stored.

As described above, in a portable terminal having a touch screen, an embodiment of the present invention may modify attributes of an object displayed on a screen. In this case, a touch screen of the present invention may equally operate regardless of a difference between a resistive type and a capacitive type. In embodiments, as described previously, a part of an object displayed on a screen is firstly touched by a human appendage or a stylus to select an object whose attribute is modified or a location of an object to be pasted. Next, the user may secondly touch (touch and drag) using another appendage to modify a selected attribute of the object. There may be execution of an angle, a size, a shape, or function of the object as a type of a modified attribute of the object.

Embodiments of the present invention detect a touch & hold and selection (first touch) of an object whose attribute is modifiable from a displayed screen, and detect a touch and drag on another part of the screen caused by another touch in the selected state of the object to modify the attribute of the object. Accordingly, the present invention is advantageous in that the user can easily modify an attribute of an object displayed on a screen by a touch.

The above-described methods implemented via controller 100 according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method in a portable terminal having a touch screen, comprising:
    displaying an object having a changeable attribute;
    detecting a first touch disposed on the displayed object and selecting the object responsive to the first touch;
    detecting a second touch on a displayed background of the touch screen away from any selectable object; and
    changing the attribute of the displayed object according to a movement distance of a drag of the second touch, and displaying the object having the changed attribute,
    wherein, when the changed attribute is a visual configuration of the displayed object, and the displayed object is a widget including a plurality of sub-images:
        in response to detecting the first touch, a plurality of empty shapes are displayed adjacent to the object into which the plurality of sub-images are displayable to change the visual configuration of the displayed object, and
        in response to the drag of the second touch, changing the visual configuration by visually separating at least one of the plurality of sub-images from the displayed object and displaying the at least one of the sub-images for the object in at least one of the plurality of empty shapes.

2. The method of claim 1, wherein the second touch is detected while the first touch is maintained.

3. The method of claim 2, wherein when the changed attribute is an orientation angle, the method further comprises:
    analyzing a drag direction of the second touch to determine a rotating direction;
    rotating the displayed object clockwise with a ratio according to a moving distance of the second touch when the drag direction is a forward direction and displaying the rotated object and storing a state of the rotated object; and
    rotating the displayed object counter-clockwise with a ratio according to the moving distance of the second touch when the drag direction is a reverse direction, and displaying the rotated object and storing a state of the rotated object.

4. The method of claim 2, wherein when the changed attribute is a size, the method further comprises:
    analyzing a drag direction of the second touch to determine increase or reduction in the size of the object;
    enlarging the object with a ratio according to a moving distance of the second touch when the drag direction is a first direction and displaying the enlarged object; and
    shrinking the object with a ratio according to the moving distance of the second touch when the drag direction is in an opposite direction, and displaying the shrunk object.

5. The method of claim 2, wherein the visual configuration further comprises a plurality of predefined image configurations arranged in sequence, the method further comprising:
    analyzing a drag direction of the second touch;
    displaying one or more of the object and at least one of the plurality of sub-images in the plurality of empty shapes according to one of the plurality of predefined image configurations located in a forward order of the sequence according to a moving distance of the second touch when the drag direction is in a forward direction along an axis of movement; and
    displaying one or more of the object and removing at least one displayed sub-images in the plurality of empty shapes according to one of the plurality of predefined image configurations located in a reverse order of the sequence according to the moving distance of the second touch when the drag direction is in a reverse direction along the axis of movement.

6. The method of claim 2, when the changed attribute is a volume of a thumb-nail moving image, and the method further comprises:
    analyzing a drag direction of the second touch to determine volume up or down of a selected thumb-nail moving image;
    increasing and outputting an audio volume of audio associated with the thumb-nail moving image with a ratio according to the moving distance of the second touch when the drag direction corresponds to volume up control; and
    decreasing and outputting an audio volume of the thumb-nail moving image with the ratio according to the moving distance of the second touch when the drag direction corresponds to volume down control.

7. A non-transitory computer-readable storage medium storing one or more programs comprising instructions which, when executed by an electronic device, cause the device to execute the method according to claim 1.

8. The method of claim 1, wherein when the attribute of the displayed object is a rotatable orientation, the attribute is changed according to the drag of the second touch along a first axis of movement, and
    a second attribute of the displayed object is changed according to a drag of the second touch along a second axis of movement different from the first axis.

9. The method of claim 8, wherein the second attribute comprises one of size, a plurality of predefined images for representing the object, location, volume for media associated with the object, and a layer order of a layer on which the object is disposed.

10. The method of claim 1, wherein:
    as the movement distance of the drag increases, the visual configuration of the object changes as each of the plurality of sub-images are successively displayed within each of the plurality of empty shapes according to the movement distance, and in response to detecting a release of the drag, removing from display all of the plurality of empty shapes and maintaining display of any displayable sub-images displayed during the drag of the second touch.

11. A portable terminal, comprising:

a display unit displaying an object having a changeable attribute, the display unit including a touch screen providing touch signals responsive to touch events thereon; and a controller configured to:

detect a first touch disposed on the displayed object, and a second touch disposed on a displayed background of the touch screen away from any selectable object, change the attribute of the displayed object according to a movement distance of horizontally-oriented drag of the second touch, and display the displayed object having the changed attribute on the display unit, wherein, when the changed attribute including a visual configuration of the displayed object, and the displayed object is a widget including a plurality of sub-images, the controller is further configured to:

in response to detecting the first touch, display a plurality of empty shapes adjacent to the object into which the plurality of sub-images are displayable to change the visual configuration of the displayed object, and in response to the drag of the second touch, change the visual configuration by visually separating at least one of the plurality of sub-images from the displayed object and displaying the at least one of the plurality of sub-images for the displayed object in at least one of the plurality of empty shapes.

12. The portable terminal of claim 11, wherein the second touch is detected while the first touch is maintained.

13. The portable terminal of claim 12, wherein when a changed attribute is an orientation angle, the controller is further configured to:

analyze a drag direction of the second touch to determine a rotating direction, rotate the object clockwise with a ratio according to a moving distance of the second touch when the drag direction is a forward direction and displaying and storing the rotated object; and rotate the displayed object counter-clockwise with a ratio according to the moving distance of the second touch when the drag direction is a reverse rotation and displaying and storing the rotated object.

14. The portable terminal of claim 12, wherein when the changed attribute is a size, the controller is further configured to analyze a drag direction of the second touch to determine increase or reduction in the size of the object, increase the size of the object with a ratio according to a moving distance of the second touch when the drag direction is a first direction, and reduce the size of the object with the ratio according to the moving distance of the second touch when the drag direction is opposite the first direction.

15. The portable terminal of claim 11, wherein the controller is further configured to:

in the movement distance of the drag increases, the visual configuration of the object is changed as each of the plurality of sub-images are successively displayed within each of the plurality of empty shapes according to the movement distance, and in response to detecting a release of the drag, removing from display all of the plurality of empty shapes and maintaining display of any displayable sub-images displayed during the drag of the second touch.

\* \* \* \* \*